(12) United States Patent
Küchel

(10) Patent No.: US 7,612,893 B2
(45) Date of Patent: Nov. 3, 2009

(54) SCANNING INTERFEROMETRIC METHODS AND APPARATUS FOR MEASURING ASPHERIC SURFACES AND WAVEFRONTS

(75) Inventor: Michael Küchel, Oberkochen (DE)

(73) Assignee: Zygo Corporation, Middlefield, CT (US)

( * ) Notice: Subject to any disclaimer, the term of this patent is extended or adjusted under 35 U.S.C. 154(b) by 224 days.

(21) Appl. No.: 11/901,010

(22) Filed: Sep. 14, 2007

(65) Prior Publication Data

US 2008/0068613 A1    Mar. 20, 2008

Related U.S. Application Data

(60) Provisional application No. 60/845,731, filed on Sep. 19, 2006.

(51) Int. Cl.
*G01B 9/02* (2006.01)
(52) U.S. Cl. ..................................................... 356/513
(58) Field of Classification Search ............... 356/489, 356/495, 511–514
See application file for complete search history.

(56) References Cited

U.S. PATENT DOCUMENTS

| | | | |
|---|---|---|---|
| 4,697,927 A | 10/1987 | Ono | |
| 5,004,346 A | 4/1991 | Kuhel | |
| 5,187,539 A | 2/1993 | Adachi et al. | |
| 5,416,586 A | 5/1995 | Tronolone et al. | |
| 5,625,454 A | 4/1997 | Huang et al. | |
| 5,844,670 A | 12/1998 | Morita et al. | |
| 6,222,621 B1 | 4/2001 | Taguchi | |
| 6,312,373 B1 | 11/2001 | Ichihara | |
| 6,456,382 B2 | 9/2002 | Ichihara et al. | |
| 6,714,307 B2 * | 3/2004 | De Groot et al. | ............ 356/512 |
| 6,714,308 B2 | 3/2004 | Evans et al. | |
| 6,781,700 B2 | 8/2004 | Kuchel | |

(Continued)

FOREIGN PATENT DOCUMENTS

JP    2004045168 A   *   2/2004

*Primary Examiner*—Samuel A Turner
(74) *Attorney, Agent, or Firm*—Fish & Richardson P.C.

(57) ABSTRACT

Interferometric scanning method(s) and apparatus for measuring test optics having aspherical surfaces including those with large departures from spherical. A reference wavefront is generated from a known origin along a scanning axis. A test optic is aligned on the scanning axis and selectively moved along it relative to the known origin so that the reference wavefront intersects the test optic at the apex of the aspherical surface and at one or more radial positions where the reference wavefront and the aspheric surface intersect at points of common tangency ("zones") to generate interferograms containing phase information about the differences in optical path length between the center of the test optic and the one or more radial positions. The interferograms are imaged onto a detector to provide an electronic signal carrying the phase information. The axial distance, v, by which the test optic is moved with respect to the origin is interferometrically measured, and the detector pixel height corresponding to where the reference wavefront and test surface slopes match for each scan position is determined. The angles, $\alpha$, of the actual normal to the surface of points Q at each "zone" are determined against the scan or z-axis. Using the angles, $\alpha$, the coordinates z and h of the aspheric surface are determined at common points of tangency and at their vicinity with $\alpha_{min} \leq \alpha \leq \alpha_{max}$, where $\alpha_{min}$ and $\alpha_{max}$ correspond to detector pixels heights where the fringe density in the interferogram is still low. The results can be reported as a departure from the design or in absolute terms.

25 Claims, 19 Drawing Sheets

U.S. PATENT DOCUMENTS

| | | |
|---|---|---|
| 6,879,402 B2 | 4/2005 | Kuchel |
| 6,972,849 B2 | 12/2005 | Kuchel |
| 7,218,403 B2 | 5/2007 | Kuchel |
| 7,495,773 B2 * | 2/2009 | Dresel ........................ 356/512 |
| 2005/0157311 A1 * | 7/2005 | Kuchel ....................... 356/513 |
| 2007/0201035 A1 | 8/2007 | Dresel |

* cited by examiner

Initial part
alignment

Move stage to cat's eye position and take a phase-measurement.
Minimize the quadratic term in a power series expansion of the
measured phase-map by adjusting the z-position of the stage →
the apex of the aspheric test surface coincides with the center
point of the spherical reference surface. Move stage by R0 and
null the DMIs: w=0.

Choose two different w-position $w_1$ and $w_2$, for which the
associated diameters of the zone, $2h_1$ and $2h_2$ are
considerable different, and for which the quantities:

$$\gamma_1 = 1 - |R_1/R_{s1}| \qquad \gamma_2 = 1 - |R_2/R_{s2}|$$

are both not close to zero; the best positions for w are those,
for which both quantities are large and $2h_2 - 2h_1$ is large.

With the given aspheric equation z=z(h)
and its derivatives it is $$R_1 = h_1 \cdot \frac{\sqrt{1+z'(h_1)^2}}{z'(h_1)} \qquad R_2 = h_2 \cdot \frac{\sqrt{1+z'(h_2)^2}}{z'(h_2)}$$

$$R_{e1} = \frac{\sqrt{(1+z'(h_1)^2)^3}}{z''(h_1)} \qquad R_{e2} = \frac{\sqrt{(1+z'(h_2)^2)^3}}{z''(h_2)}$$

Alignment in 4 degrees of freedom, x,y, rx, ry of the stage.
Alignment targets: the 2 tilt components Z12, Z13 at zone h1 as
well as Z22, Z23 at zone h2.
Solution: establish and invert linear system of 4 equations. The
solution of the equation delivers the 4 unknown shifts x,y and
tilts rx,ry of the stage which remove the tilt components Z12,
Z13, Z22, Z23 in the zones simultaneously.

FIG. 8

Establish magnification function M

The height maps measured for every scan position w are phase-unwrapped and stored already; we call them the matrices H and their entry points are the pixel numbers $x_{pix}$ and $y_{pix}$. There are msteps such matrices H.

↓

Take the "mean radial profile" of every matrix H, thus converting the matrix into a vector. The center point for the integration along the angular coordinate is constant for all matrices H and found during part alignment as the center of the two zones used. The mean radial profile derived from one matrix H with scan position w is one row in the matrix q. The columns in q are associated with $h_{pix}$, i.e. pixel numbers in detector coordinates.

↓

Near the center, the phase-unwrapping procedure delivers absolute values of matrix q, which already include the correct integer multiples of λ/2. We concentrate in a first step only on these parts of the q-matrix, which smaller column indices.

↓

$$M_0(h_{pix}) = \frac{h_{pix\,max}}{NA_{max}}$$

i = 1 scanpos $w_i$

Compute:

$$h_0(M_0) = (R_0 + w - q(h_{pix})) \cdot \frac{h_{pix}}{M_0(h_{pix})}$$

$$z_0(M_0) = (R_0 + w) - (R_0 + w - q(h_{pix})) \cdot \sqrt{1 - \left(\frac{h_{pix}}{M_0(h_{pix})}\right)^2}$$

$h_0$, $z_0$ are points in object coordinates, $h_{pix}$ are points in image (detector) coordinates. $q(h_{pix})$ are measured values; for every scan position w we have a number of adjacent, unwrapped values $q(h_{pix})$, and we can compute the associated point pairs $h_0,z_0$.
The quantity that "bridges" object and image is $M(h_{pix})$. The goal is to find the correct value for $M(h_{pix})$.

↓

Compute a "continuous" function through the point pairs $h_0,z_0$ by using spline interpolation technique. Calculate interpolated values $z_w=z_w(h_g)$ for a predefined dense grid of values $h_g$. The index w indicates, that this result is for the scan position w.

↓ i = msteps? — no → i := i+1 (loop back)

↓ yes

Calculate standard deviation of all msteps values of $z_w(h_g)$ → vector stdzw($h_g$)

↓

Choose the values $a_0, a_2, a_4, a_6$ in $$M(h_{pix}) = a_0 + a_2 \cdot h_{pix}^2 + a_4 \cdot h_{pix}^4 + a_6 \cdot h_{pix}^6$$

according to an optimization strategy with the target, that the function stdzw($h_g$) becomes minimal for all values $h_g$ → new value for $M_0$

↓ stdzw($h_g$) < limit? — iteration (loop back)

↓ yes

Values $a_0, a_2, a_4, a_6$ are known.

FIG. 18

SCANNING INTERFEROMETRIC METHODS AND APPARATUS FOR MEASURING ASPHERIC SURFACES AND WAVEFRONTS

CROSS-REFERENCE TO RELATED APPLICATION

This application claims the benefit of priority from U.S. Provisional Patent Application No. 60/845,731 filed on Sep. 19, 2006 and entitled SCANNING INTERFEROMETRIC METHODS AND APPARATUS FOR MEASURING ASPHERIC SURFACES AND WAVEFRONTS, the entire contents of which are incorporated herein by reference.

FIELD OF THE INVENTION

In general, this invention relates to the field of interferometry and, in particular, to the high accuracy measurement of aspherical surfaces and wavefronts in an absolute manner.

BACKGROUND OF THE INVENTION

Aspherical surfaces have become more and more important in modem optical systems because they offer a higher number of parameters for simplifying systems while optimizing their performance. This can lead to systems with less surfaces, less weight, smaller dimensions and higher states of correction, to mention only a view advantages. This is especially true in fields where a high number of optical surfaces are not practical, like in astronomical telescopes or normal incidence reflecting surfaces for the EUV wavelength of 13.6 nm used for lithography tools where it is mandatory to keep the number of surfaces as low as possible. In such cases, there is no choice but to use aspherical surfaces. With demands for high quality performance for complete systems operating in the EUV-regime, the surface errors of reflecting surfaces within such a system must be kept below 0.1 nm, and the measuring accuracy and precision for such errors must be even higher to be able to produce the surfaces in a deterministic manner. In addition, lens surfaces in multi-element lithography lenses operating at wavelengths of 193 nm and 157 nm are made aspherical to lower the number of elements made, which are of rare and expensive materials. In these cases, the departures from a best fitting sphere can be as large as 1000 μm, and the dimensions of such lens surfaces have increased to nearly 500 mm.

In an optical system, the function of any of its lens elements is to modify the wavefront transmitted by the individual lens elements according to the optical design of the whole system. If a spherical wave or a plane wave enter such a lens, an aspherical wavefront with a very high departure from the best fitting sphere is produced, depending on the conjugates used in the particular test-configuration. So even the fundamental single lens element with either spherical or aspherical surfaces can only be tested properly if one is able to deal with aspherical wavefronts in a test set-up. Moreover, this ability is very important to testing wavefronts transmitted through lens elements because inhomogeneity of the lens material itself can deteriorate the wavefront even when the surfaces are otherwise free of error.

The measurement of aspherical surfaces and wavefronts has been very difficult because of the large departure from the best fitting sphere. With interferometric measurements, high precision is by making the dynamic range of the measurement very small, and for this purpose, the wavefront of the reference wavefront, against which the aspherical wavefront is compared, has to be made aspherically as well to ideally fit the wavefront to be measured completely. In prior art, this has been done either by refractive systems, so called "null-lenses", or with diffractive elements, so called "computer generated holograms", which alter a wave of known and measurable shape (spherical or preferably plane wave) as it transits the compensation element to fit the design aspherical surface at the location where it is placed in the test-set up by design.

In all these cases, the compensation element must be tested to be sure that the correct wavefront is delivered for comparison. But, it is obvious that the same difficulties exist for this type of testing because, again, an aspherical wavefront is produced. Therefore, only indirect test methods are applied by, for instance, measuring the surface of each lens element used in a null system, which is exclusively built with the help of spherical surfaces. Also, the refractive index of the lens material, the lens thickness and the air-spacing of the lenses are measured carefully. Nevertheless, the final accuracy is questionable because of accumulation of measurement errors and the uncertainty of the homogeneity within the lens material.

There are many methods and apparatus in the prior art for measuring aspherical optical surfaces, for example: 1. Contacting and non-contacting stylus based profilers; 2. Contacting and non-contacting stylus based coordinate measuring machines; 3. Spherical wavefront interferometers; 4. Lateral and radial shearing interferometers; 5. Interferometers with null lenses in the measurement path; 6. Scanning spherical wave interferometers; 7. Scanning white light interferometers; 8. Sub-aperture stitching interferometers; 9. Interferometers using computer generated holograms-CGHs; 10. Point diffraction interferometers-PDIs; 11. Longer wavelength interferometry; and 12. Two wavelength interferometry. While these techniques have utility for many applications, they are limited in their operational capabilities or precision compared with those needed for today's evolving lithography applications.

Contacting and non-contacting stylus based profilers mechanically scan the aspherical surface under test and, therefore, are slow because they measure only a few data points at a time. Slow techniques are very susceptible to measurement errors due to temperature variations during the measurement. The same limitations apply to contacting and non-contacting stylus based coordinate measuring machines.

Spherical wavefront interferometers usually require the spacing between the element generating the spherical wavefront and the aspherical surface under test to be scanned thereby increasing the measurement time for the entire surface under test thus introducing another parameter which must be measured, usually by another measurement device, and means, commonly known as stitching, for connecting the data from the various zones which fit as the spacing is scanned.

Scanning white light interferometers have many of the same limitations as spherical wavefront interferometers. Lateral and radial shearing interferometers usually measure the slope of the surface under test and thereby introduce measurement errors during the reconstruction of the surface under test via integration of the slopes. This latter type of limitation applies to differential types of profiling techniques as well.

Sub-aperture stitching interferometers introduce serious measurement errors in the stitching process. Interferometers using computer generated holograms are susceptible to errors introduced by the CGH and stray Moire patterns. It is also difficult to calibrate, i.e., know the calibration of the CGH. Point diffraction interferometers are a class of spherical wavefront interferometers, and therefore, have many of the same limitations, as well as poor lateral spatial resolution.

None of the prior art approaches is entirely satisfactory since each involves a trade-off that places long lead times on the design of the measurement apparatus and method, requires additional fabrication, increases the difficulty of using and calibrating the measurement apparatus, decreases the accuracy and precision, and greatly increases the cost and delivery time of the aspherical optical element.

As a result of certain deficiencies in prior approaches to measuring aspheres, it is a principle object of the present invention to provide a method(s) and apparatus for high accuracy absolute measurement of aspherical surfaces or aspherical wavefronts, either the surface of the final optical part or the wavefront of the final optical lens element in transmission, or by absolutely qualifying the compensation elements for the measurement of aspheres, being either of the refractive, diffractive of reflective type, therefore enabling other, more productive methods for the measurement of the components to be produced in volume.

It is another object of this invention to measure the deviation of a given surface, such as an aspheric surface, from its nominal design shape in a direction normal to the surface.

It is another object of the present invention to provide method(s) and apparatus for measuring aspherical surfaces and wavefronts with large aspherical departures and surface slopes.

It is yet another object of this invention to provide method(s) and apparatus for measuring aspherical surfaces and wavefronts with small departures from spherical surfaces.

It is another object of the present invention to provide method(s) and apparatus for measuring aspherical surfaces and wavefronts with large diameters and clear aperture.

It is yet another object of the present invention to provide method(s) and apparatus which can be adapted to different measurement purposes and aspherical surfaces and wavefronts in an easy manner.

It is still another object of the present invention to provide method(s) and apparatus for measuring aspherical surfaces and wavefronts which can be calibrated absolutely.

It is a further object of the present invention to provide method(s) and apparatus which have highly reduced sensitivity to vibrations when measuring aspherical surfaces and wavefronts.

It is another object of the present invention to provide method(s) and apparatus which have reduced sensitivity to temperature changes while measuring aspherical surfaces and wavefronts.

It is yet another object of the present invention to provide method(s) and apparatus which have reduced sensitivity to air turbulence of the gas in the interferometer (measurement) cavity while measuring aspherical surfaces and wavefronts.

It is a further object of the present invention to provide method(s) and apparatus that can work with a light source of coherence length only equal to the aspherical departure.

It is yet a further object of the present invention to provide method(s) and apparatus which can also work with wavelengths for which only point detectors exist (UV and IR-range).

It is still a further object of the present invention to provide method(s) and apparatus which automatically adjust for the spatial location from where the measurement points are sampled.

It is still another object of the present invention to provide method(s) and apparatus which can be adjusted to the spatial resolution required for the measurement.

It is yet a further object of the present invention to provide method(s) and apparatus which have reasonable speed of measurement.

It is still a further object of the present invention to provide method(s) and apparatus which compute both critical coordinates of the aspherical surface, the radial distance h and the axial distance, z, solely from interferometric measurements and not from the geometrical mapping of the detectors onto the surface.

It is a further object of the invention to measure the difference between the design and actual values of strong aspheric surfaces or with local variations.

Other objects of the invention will, in part, be obvious and will, in part, appear hereinafter when the detailed description is read with reference to the drawings.

SUMMARY OF THE INVENTION

The invention generally relates to interferometry and particularly to interferometric scanning methods and apparatus for measuring test optics having aspheric surfaces, including those with large departures from spherical.

In one aspect of the invention, a reference wavefront is generated from a known origin along a scanning axis. A test optic is aligned on the scanning axis and selectively moved along it relative to the known origin so that the reference wavefront intersects the test optic at the apex of the aspherical surface and at one or more radial positions where the reference wavefront and the aspheric surface intersect at points of common tangency ("zones") to generate interferograms containing phase information about the differences in optical path length between the center of the test optic and the one or more radial positions. The interferograms are imaged onto a detector to provide an electronic signal carrying the phase information. The axial distance, v, by which the test optic is moved with respect to the origin is interferometrically measured, and the detector pixel height corresponding to where the reference wavefront and test surface slopes match for each scan position is determined. The angles, $\alpha$, of the actual normal to the surface of points Q at each "zone" are determined against the scan or z-axis. Using the angles, $\alpha$, the coordinates z and h of the aspheric surface are determined at common points of tangency.

In another aspect the angles are calculated in the vicinity around where $\alpha$ corresponds to a slope match such that $\alpha_{min} \leq \alpha \leq \alpha_{max}$, where $\alpha_{min}$ and $\alpha_{max}$ correspond to detector pixels heights where the fringe density in the interferogram is still low. The results can be reported as a departure from the design or in absolute terms.

In another aspect of the invention, the angles $\alpha$ are calculated by finding the positions in the image of the surface at scan positions, w, where:

$$\frac{dq}{dh_{pix}} = \text{zero}$$

for every pixel, where q is the difference between reference and test surfaces near the point where their slopes match and then calculating the corresponding angles $\alpha$ by:

$$\arccos\left(1 - \frac{dq}{dw}\right).$$

The reference wavefront is preferably at least a partial spherical wavefront generated from the known origin along the scanning axis through the use of a spherical reference surface along the scanning axis upstream of said known origin.

In another aspect of the invention, the angles, α, are calculated using the optical properties of the system used to image the interferograms where the optical properties used to calculate the angles α comprise a mathematical function that relates pixel height, $h_{pix}$, in image space to said angle α in object space and is expressible preferably in the form of a polynominal of the form:

$$M(h_{pix}) = \frac{h_{pix}}{\sin\alpha} = a_0 + a_2 \cdot h_{pix}^2 + a_4 \cdot h_{pix}^4 + a_6 \cdot h_{pix}^6$$

$$M(\sin\alpha) = \frac{h_{pix}}{\sin\alpha} = b_0 + b_2 \cdot \sin^2\alpha + b_4 \cdot \sin^2\alpha + b_6 \cdot \sin^6\alpha$$

where the coefficients $a_n$ and $b_n$ are determined experimentally.

The coefficients $a_n$ and $b_n$ are determined experimentally prior to making any measurements of an aspheric surface and may be determined with an artifact of known shape.

The coordinates h and z are given by:

$$\begin{pmatrix} h \\ z \end{pmatrix} = \begin{pmatrix} \sin\alpha & 0 \\ -\cos\alpha & 1 \end{pmatrix} \cdot \begin{pmatrix} R_s \\ R_v \end{pmatrix} \begin{pmatrix} \sin\alpha & 0 \\ -\sqrt{1-\sin^2\alpha} & 1 \end{pmatrix} \cdot \begin{pmatrix} R_s \\ R_v \end{pmatrix}$$

$$\begin{pmatrix} h \\ z \end{pmatrix} = \begin{pmatrix} \frac{h_{pix}}{M(h_{pix})} & 0 \\ -\sqrt{1-\left(\frac{h_{pix}}{M(h_{pix})}\right)^2} & 1 \end{pmatrix} \cdot \begin{pmatrix} R_s(h_{pix}) \\ R_v(h_{pix}=0) \end{pmatrix}$$

$$\begin{pmatrix} h \\ z \end{pmatrix} = \begin{pmatrix} \frac{h_{pix}}{M(h_{pix})} & 0 \\ -\sqrt{1-\left(\frac{h_{pix}}{M(h_{pix})}\right)^2} & 1 \end{pmatrix} \cdot \begin{pmatrix} R_2 - d_{zone}(h_{pix}) \\ R_2 - d_{apex}(h_{pix}=0) \end{pmatrix}$$

In another aspect of the invention, the optical properties are determined while measuring an aspheric test surface.

In another aspect of the invention, the optical properties are determined using an optimization routine.

In another aspect the invention comprises an interferometric scanning apparatus having a scanning axis and comprising a radiation source and optical arrangement for generating a reference wavefront from a known origin along the scanning axis. A precision manipulator is provided for aligning a test optic on the scanning axis and selectively moving it along the scanning axis relative to the known origin so that the reference wavefront intersects the test optic at the apex of the aspheric surface and at one or more radial positions where the reference wavefront and the aspheric surface intersect at points of common tangency in circular zones around the scanning axis to generate interferograms containing phase information about the differences in optical path length between the center of the test optic and the one or more radial positions. A two-dimensional detector is provided to receive the interferograms and optics are included for imaging the interferograms onto the detector to provide an electronic signal carrying the phase information. A distance measuring interferometer interferometrically measures the axial distance, v, by which the test optic is moved with respect to the origin; and a programmable device is used to: p determine the detector pixel height corresponding to where the reference wavefront and test surface slopes match for each scan position; p determining the angles, α, of the actual normal to the surface of points at each zone as a function of the distance along the scanning axis; and p use the angles, α, determining the coordinates z and h of the aspheric surface at the common points of tangency.

The optical arrangement preferably includes a reference sphere upstream of the origin to generate the reference wavefront as a spherical wavefront and the general architecture of the apparatus is preferably of Fizeau form.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein:

FIG. 8 is a flowchart showing the steps of an "Initial Part Alignment" sequence used in practicing the invention;

FIG. 18 is a flowchart showing the steps of carrying out an "Establish Magnification Function M" sequence used in practicing the invention;

DETAILED DESCRIPTION OF THE INVENTION

The present invention relates generally to interferometric apparatus and methods and particularly to interferometric apparatus and associated algorithms by which the shapes of aspheric surfaces and wavefronts can be measured and compared with their designs. To achieve this, the invention utilizes interferometric measurements in object space, where a test surface resides in an interferometric cavity, and their relationships to parameters and detector pixels in image space, where interferograms are imaged on a detector comprising an array of pixels. As a part to be measured is scanned along a scan axis with a known wavefront from the reference surface, the position of the part with respect to reference is interferometrically measured where the local slopes of the reference and part match to generate quantitative information in object space about the axial location of the coordinate of the position where these local slopes match. Along with this information, the vertical location of the pixel in image space, i.e., on the detector, corresponding to where the local slopes match is then determined and that information, along with knowledge of the imaging properties of the lens forming the interferogram, is used to calculate the angle in object space along with particular pixels view the part surface at the time of a local slope match. Once the angle is known, the vertical coordinate to the test surface is calculated thereby completely locating the axial and vertical coordinates on the test surface of the slope.

Figure 1:
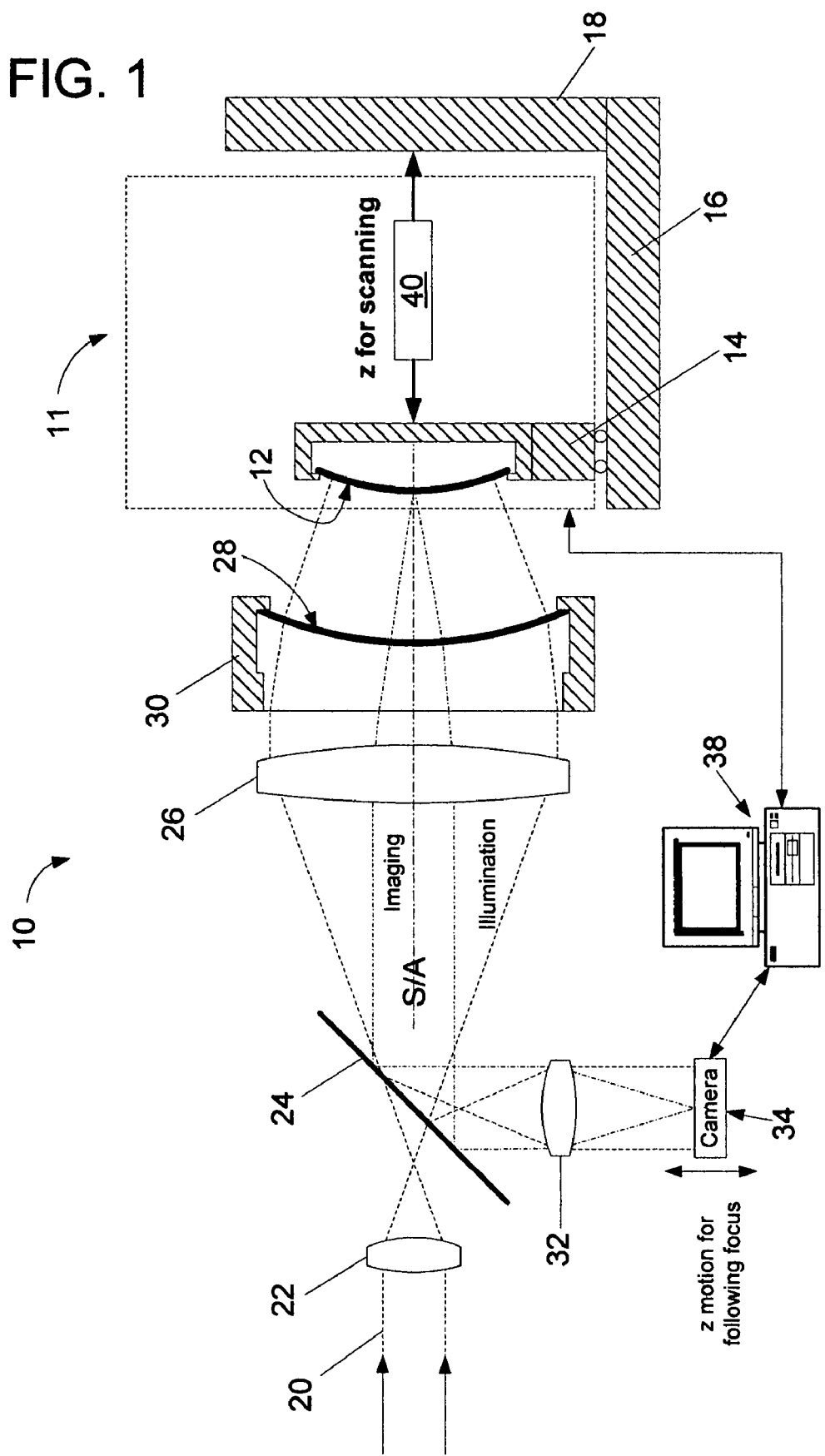
FIG. 1 is a diagrammatic plan view of an optical test arrangement in accordance with the invention.

An example of a test system for practicing the invention is shown in FIG. 1 where it is designated generally at 10. As seen there, a part 12 under test is supported on a precision manipulator stage 11 comprising a part holder 12 that rides on precision guides 16. The position of part 12 along a scan axis, S/A, with respect to a reference surface 18 is interferometrically measured by a conventional interferometer 40. The precision manipulator stage 11 operates in a conventional manner to permit the part 12 to be precisely controlled in 6 degrees of freedom including x, y, rx, and ry for alignment and rz for calibration.

A transmission sphere 28 is positioned and held in place by conventional mounting arrangement 30. A beam of laser radiation 20 is provided from the left. The beam 20 passes through a lens 22 structure to focus it to a point after which it expands to travel through a beamsplitter 24. After emerging from beamsplitter, beam 20 continues to expand until it encounters a lens 26 for collimating it for travel to transmission sphere 28 that generates a converging reference wavefront that ultimately impinges on part 12. The beam illuminating the part is bounded by the dashed rays as it courses from it origin to part 12.

As will be explained in further detail below, part 12 is moved along the scan axis (z-direction for scanning) to generate interferograms where the converging reference wavefront slope matches the local slope of the part. These interferograms are imaged via imaging optics 32 on to a two-dimensional detector (CCD or the like) resident in a camera 34 that may be moved along the z-axis for focusing purposes. The imaging path from the part 12 to the camera 34 is generally bound by the dash-dot rays.

A computer 38 is provided to provide housekeeping and control functions, a user interface, communication with various system components through suitable interfaces, and is otherwise programmed to carry out the various procedural steps and calculations to be described.

Having described the general architecture of the measurement system 10, shown as a Fizeau, a more detailed description of the various measurement and data reduction procedures of the invention will now be taken up with reference to the problems addressed by the invention.

1. Definition of the Problem-Area to be Solved

The invention distinguishes between two different problem areas to be solved. The first one involves the problem of reconstructing an aspheric surface of a physical test sample without using (or knowing) its design equation. In this case, use cannot be made of any a priori knowledge of a "design equation" to support the evaluation. The result may be a point cloud x,y,z or, more convenient, z values for a set of x,y-points on a regularly spaced grid. From both, a "best fitting aspheric equation" may be calculated. It is clear, that the rotationally varying part, RV, of the measured surface cannot be expressed by the conventionally used aspheric design equation, which only has the variables h and z, and therefore, is a function in two variables for a rotationally symmetrical surface. Even the rotationally invariant part, R1, of surfaces will not be expressed with high spatial resolution by fitting to a design equation. In practice, when the goal is to determine the equation of the underlying sample, it might be sufficient to deal with the problem in cylindrical coordinates, z=z(h,theta), where z is the axis of rotation (of the axial symmetrical surface), h is the radial coordinate and theta is the azimuthal angle. Then, the mean value of all measurements can be taken along the theta-coordinate (i.e., integrate along circles), and therefore simplify the problem to two dimensions. The information about the typical "aspheric" deviation is completely preserved by this procedure.

The second problem contemplated by the invention it to measure the deviation of an aspheric surface of a test surface compared with its design equation. This can be seen as the comparison of two surfaces against each other where one is "real" and the other is "virtual" (speaking in terms of optical imaging). Here, the procedure for making this comparison must be made, and it is one objective of this description to provide a convincing procedure for accomplishing the comparison. In this task, it is possible (but may be not necessary) to make use of a priori knowledge of the surface given by the design equation.

Consequently, the invention is described as principles of measurement, which use not only measurements at a "zone" where the aspheric surface and the reference surface have common tangents, but also the use of measured points in a vicinity of the zone. At measured points in the vicinity of the zone, there is a lack of information compared to the very zone (the "red circle"), which is, that the slope of the surface-point measured is not known.

2. Abbreviations and Formula: p The following conventions have been adopted in describing the invention and appear in FIGS. 2 and 3.

index m: measured quantities or quantities derived from measurement index d: quantities derived from the design equation of the aspheric surface h,z: Cartesian coordinates of a point Q on the aspheric surface v,w: v is the is a stage coordinate along z-axis with v=0 at distance $R_0$ from center of fitting spherical apex sphere of the aspheric surface at the test plan, w is the actual position during measurement.

Figure 2:
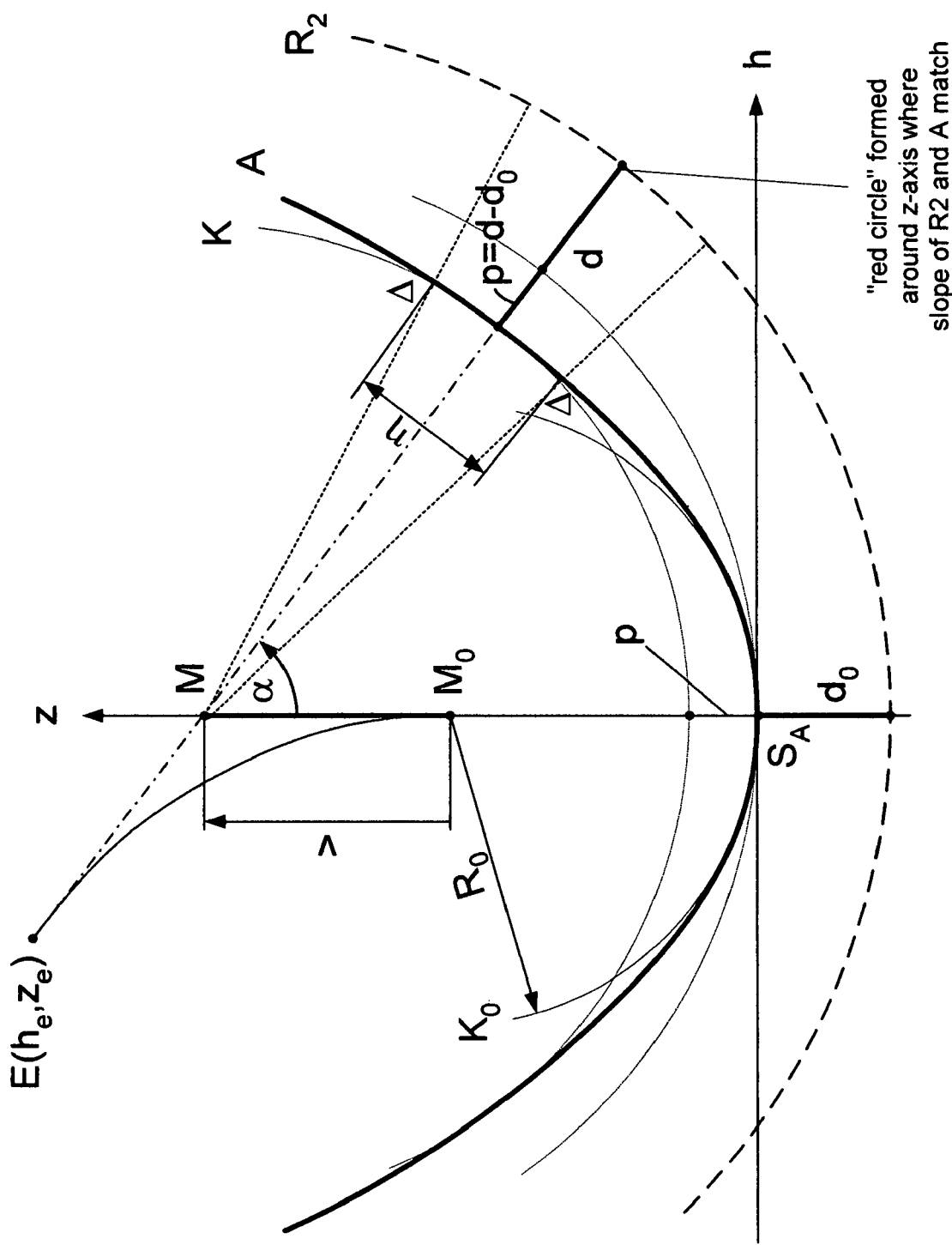
FIGS. 2 and 3 are diagrams for visualizing certain basic parameters used in practicing the invention including $R_0$, $R_2$, $d_0$, d, p, v, h, z, and α.

M: center point of spherical reference surface with radius $R_2$ $\alpha$: angle of actual normal to the surface point Q at "the zone"; $\alpha$ is measured against the scan-direction=z-axis $\alpha_{min} < \alpha < \alpha_{max}$: range of angles as measured from M when a "broader" zone is measured, i.e. not only the one point at the surface, where the reference surface and the aspheric surface have a common normal with angle $\alpha$; see FIG. 4.

p, q: difference in distance between the Fizeau-gap at the zone and the apex of the aspheric surface, i.e. $p=d-d_0$ in the FIG. 2, this is true for the point where the reference surface and the aspheric surface have a common tangent, i.e. the line from M to Q is normal to the surface. In the area around this point, the aspheric surface starts to depart from the circle with center in M; we still can take measurements here, we call the values q (i.e., p is a special case of q). See FIG. 4 for the definition of q. In the region where the gradient of this departure (in single pass, as shown in FIG. 2; the other case would be OPD, which is what is really measured) is less than $\lambda/4$ per pixel of the CCD detector, we are below the "Nyquist limit"; we will not use measured values which are taken above 0.3 of the "Nyquist limit". When this is assured, we do not corrupt the result considerably by optical aberrations of the mainframe.

$E(h_e, z_e)$: Point on the evolute of the surface, which is the local center of a fitting sphere at Q(h,z).

Figure 3:
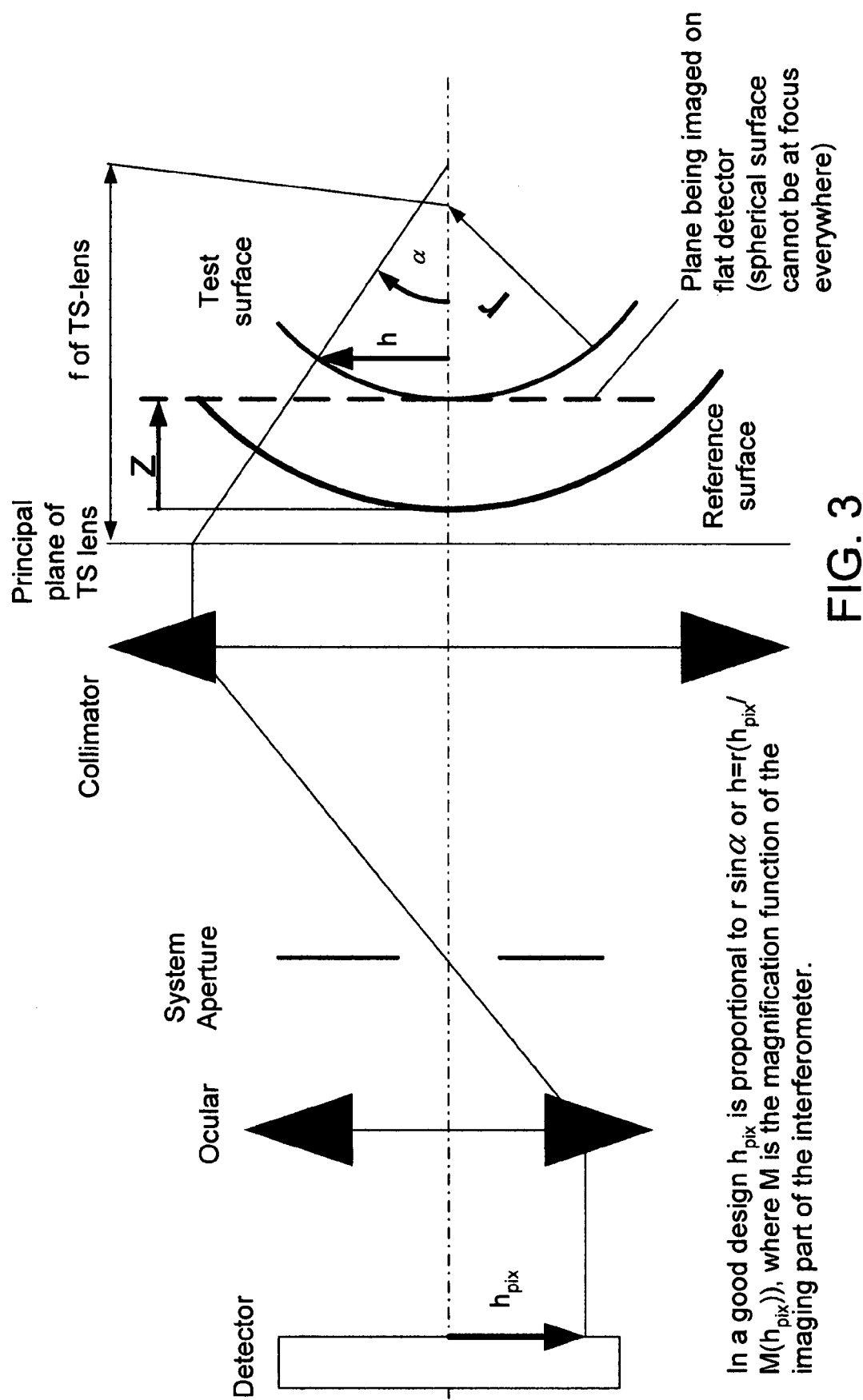

Keeping in mind the parameters defined in FIG. 2, reference is now made to FIG. 3, which illustrates the fundamental technique for determining the coordinates h and v of a point on the test surface where the test surface and the reference wavefront have common tangents, i.e., where their slopes are identical. The test surface is scanned with the wavefront from the reference surface to form a series of interferograms where there will be slope matches between the reference wavefront and aspheric surface (these will be the "red circle" of FIG. 1). From the image of the interferograms, the pixel height $h_{pix}$ can readily be obtained. With $h_{pix}$ known and knowledge of the optical characteristics of the imaging system, $\alpha$ can be determined from which both h and z in object space can be calculated.

It is assumed that for every zone (i.e., where there is a slope match), an equation is given that allows the computation of h, z(h), z'(h). From FIG. 1, the following useful formulas can be derived where the meaning of the quantities is as shown in FIG. 1.

$$\begin{pmatrix} \sqrt{1+\frac{1}{z'^2}} & 0 \\ \frac{1}{z'} & 1 \end{pmatrix} \cdot \begin{pmatrix} h \\ z \end{pmatrix} =$$

$$\begin{pmatrix} \frac{1}{\sin\alpha} & 0 \\ \frac{\cos\alpha}{\sin\alpha} & 1 \end{pmatrix} \cdot \begin{pmatrix} h \\ z \end{pmatrix} = \begin{pmatrix} \frac{1}{\sin\alpha} & 0 \\ \frac{\sqrt{1-\sin^2\alpha}}{\sin\alpha} & 1 \end{pmatrix} \cdot \begin{pmatrix} h \\ z \end{pmatrix} = \begin{pmatrix} R_s \\ R_v \end{pmatrix} = \begin{pmatrix} R_2 - d_{zone} \\ R_2 - d_{apex} \end{pmatrix}$$

-continued $$\begin{pmatrix} h \\ z \end{pmatrix} = \begin{pmatrix} \sin\alpha & 0 \\ -\cos\alpha & 1 \end{pmatrix} \cdot \begin{pmatrix} R_s \\ R_v \end{pmatrix} = \begin{pmatrix} \sin\alpha & 0 \\ -\sqrt{1-\sin^2\alpha} & 1 \end{pmatrix} \cdot \begin{pmatrix} R_s \\ R_v \end{pmatrix}$$

$$\begin{pmatrix} h \\ z \end{pmatrix} = \begin{pmatrix} \frac{h_{pix}}{M(h_{pix})} & 0 \\ -\sqrt{1-\left(\frac{h_{pix}}{M(h_{pix})}\right)^2} & 1 \end{pmatrix} \cdot \begin{pmatrix} R_s(h_{pix}) \\ R_v(h_{pix}=0) \end{pmatrix}$$

$$\begin{pmatrix} h \\ z \end{pmatrix} = \begin{pmatrix} \frac{h_{pix}}{M(h_{pix})} & 0 \\ 1\sqrt{1-\left(\frac{h_{pix}}{M(h_{pix})}\right)^2} & 1 \end{pmatrix} \cdot \begin{pmatrix} R_2 - d_{zone}(h_{pix}) \\ R_2 - d_{apex}(h_{pix}=0) \end{pmatrix}$$

From the above equation for h and z, expressed in matrix form, it can be seen that h and z are functions of $h_{pix}$, $M(h_{pix})$, $R_2$, and $d_{zone}$ and $d_{apex}$, all of which are interferometrically measured or predetermined.

The magnification M of the imaging part of the interferometer (imaging the test surface to the detector as shown in FIG. 3) is defined as:

$$M(h_{pix}) = \frac{h_{pix}}{\sin\alpha} = a_0 + a_2 \cdot h_{pix}^2 + a_4 \cdot h_{pix}^4 + a_6 \cdot h_{pix}^6 + \ldots$$

$$M(\sin\alpha) = \frac{h_{pix}}{\sin\alpha} = b_0 + b_2 \cdot \sin^2\alpha + b_4 \cdot \sin^4\alpha + b_6 \cdot \sin^6\alpha + \ldots$$

It is assumed that the coefficients $a_i$ and $b_i$ are already known from a measurement with an artifact in a method to be described more fully hereinafter. Then the functions $M(h_{pix})$ and $M(\sin\alpha)$ can be assumed to be known for every value of $\sin\alpha$. Therefore $\sin\alpha$ can be substituted by $$\sin\alpha = \frac{h_{pix}}{M(h_{pix})}$$

or by $$\sin\alpha = \frac{h_{pix}}{M(\sin\alpha)},$$

depending on whether the test plan is generated using a design equation or the result of a measurement has to be evaluated, computing points h, z of the surface from measurements $h_{pix}$, $d_{zone}$, $d_{apex}$ and known value $R_2$ of the reference surface. It will be understood to those skilled in the art that the magnification function M is not strictly the classical magnification but takes into account other optical properties of the imaging system. In the case where the imaging system satisfies the Abbe sine condition then only the first and second coefficients are significant, otherwise higher order terms are present. Further, it will be understood that mathematical functions other than polynomials may be used to express the optical properties. p Reference is now made to FIG. 4 which shows measurement at one scan position w; the different lines to the surface being for the different pixels with the dashed for one specific pixel which is associated with the angle $\alpha_n$ in "object space". The function $q=q(\alpha,w)$ has an extreme value at a certain angle $\alpha$. i.e., for this value $\alpha$. $dq/d\ \alpha=0$. Here, there is normal incidence on the surface and the special case $q(w, \alpha)=p(v, \alpha)$, where a is the slope of the aspheric surface in this point. Therefore at this point $dq/dw=1-\cos \alpha$.

Figure 4:
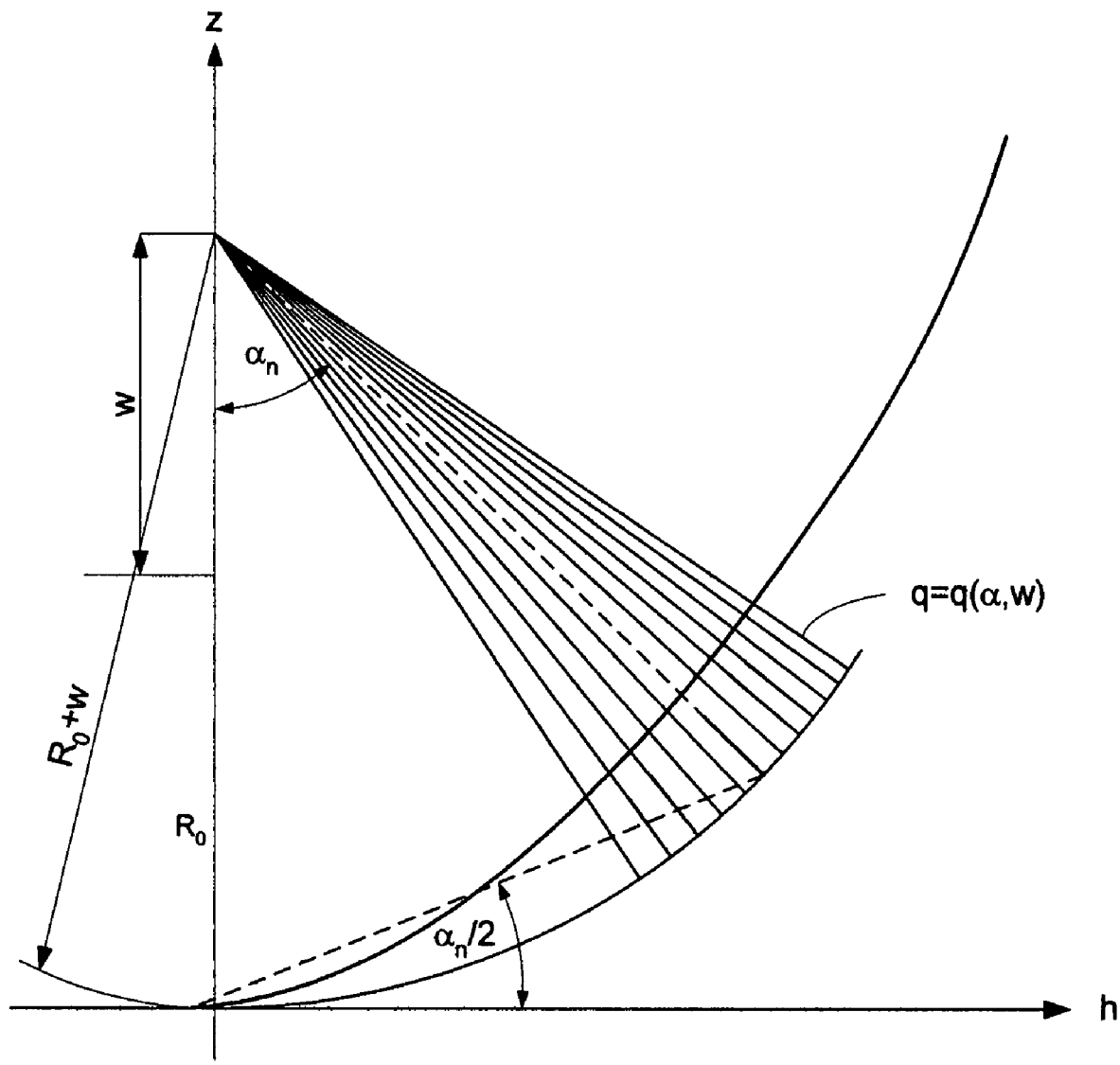
FIG. 4 is a diagram showing parameters involved in making a measurement at one scan position w where the different lines to the surface are for different pixels, and where one specific pixel represented by the dashed line is associated with the angle $α_n$ in object space.

As can be seen from FIG. 4, the above equations for h and z are still valid in the vicinity of the tangent point with coordinates (h,z) at a zone (→red circle). Therefore, these equations can be used in a broader range, at points with coordinates (h*,z*). It should be noticed, that $R_s$ and $R_v$ or equivalent $d_{zone}$ and $d_{apex}$ are distances measured interferometrically at the pixels of the detector.

Figure 5:
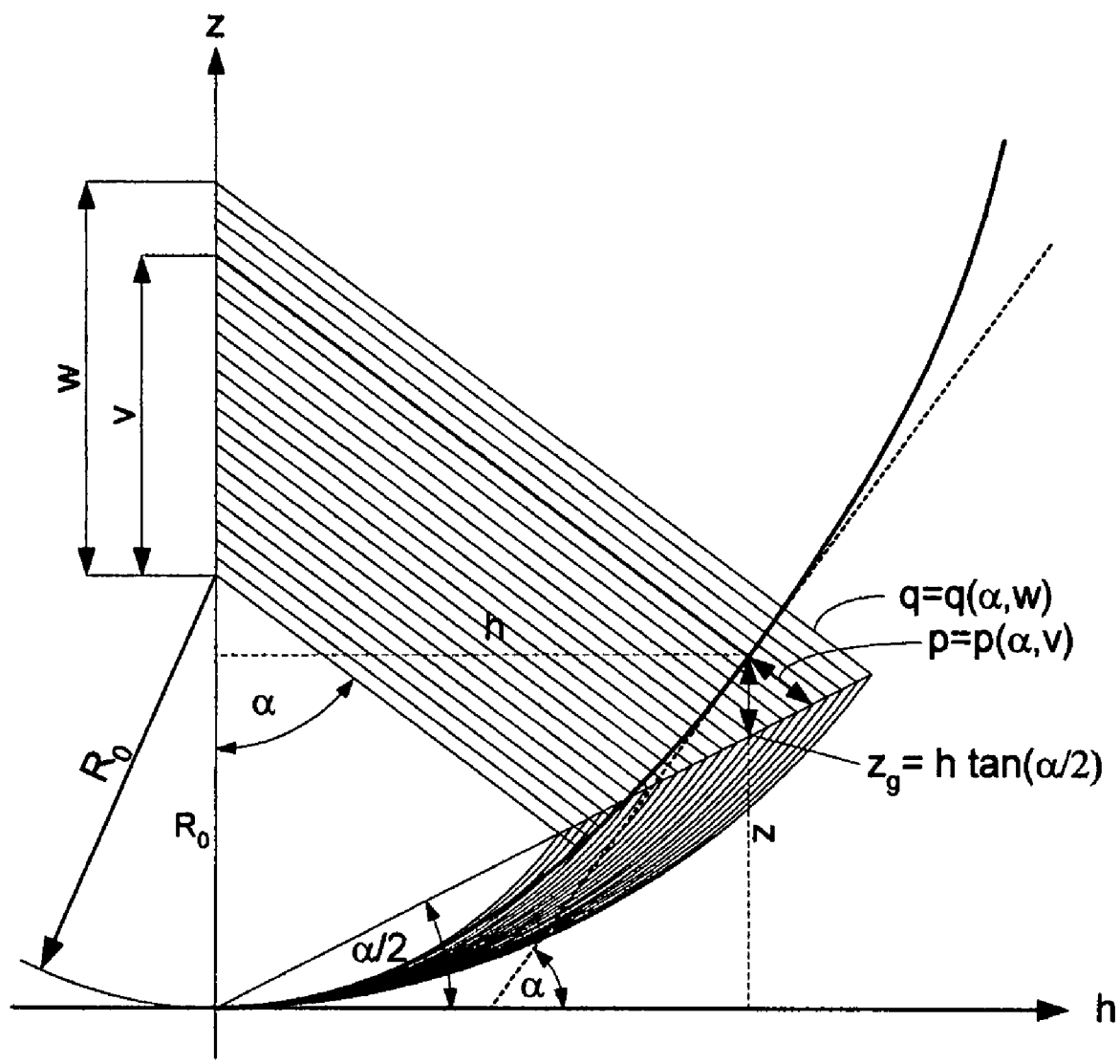
FIG. 5 is a diagram showing parameters involved in scanning a part where one arbitrarily chosen pixel of the CCD detector associated with the angle α in object space measures different points on the surface and represents another formulation of one of the fundamental equations of the invention.

Reference is now made to FIG. 5 illustrating that when a part is scanned, one (arbitrarily chosen) pixel of the CCD detector associated with the angle $\alpha$ in object space measures different points on the surface. As q increases with w nearly like a linear function, i.e., $q \approx \text{const.} + w \cdot \sin(\alpha) \cdot \tan(\alpha/2)$ and $\Delta q \approx \Delta w \cdot \sin(\alpha) \cdot \tan(\alpha/2) = \Delta w \cdot (1-\cos(\alpha))$. The special case is given for w=v, for the point where the slope of the surface is $\alpha$, then q=p and $dq/dw=1-\cos(\alpha)$ which is another formulation of one of the fundamental measurement equations.

$$h=(R_0+w-q)\cdot\sin \alpha \qquad (1)$$

$$z=(R_0+w)-(R_0+w-q)\cos \alpha \qquad (2)$$

3. Measurement Sequence

For the following, it is assumed that the aspheric equation of the part is available. The steps to be taken in a measurement sequence are as follows:
1. Make a test-plan, i.e., decide for which positions v (see FIG. 1) interferograms will be taken. These are nominal positions; the system 10 will later measure at "measured positions"; called w positions.

The test-plan can be "optimized" using different considerations, including TACT, the needed uncertainty of the result, and the deviation of the test sample from design. The test plan is made such that there is considerable "overlapping of measured areas". This means, with two consecutive positions w, there will always be points on the surface in common.
2. Take the measurements; this includes:
    a. Move the surface to cat's eye (center M of the reference surface coincides with vertex $S_a$ of aspheric surface) position and back to the "home position" by the commanded distance $R_0$ for the stage travel. Null the DMIs (See FIG. 3) which measure w in this position.
    b. Align the part by choosing two different w positions, $w_1$ and $w_2$, for which the associated diameters of the zone, $2h_1$ and $2h_2$ are considerably different, and for which the quantities:

$$\gamma_1=1-|R_1/R_{e1}| \qquad (3a)$$

$$\gamma_2=1-|R_2/R_{e2}| \qquad (3b)$$

Both are not close to zero; the best positions for w are those for which both quantities are large and $2h_2-2h_1$ is large, with (see FIG. 2):

$$R=R_0+v-p=h\cdot\frac{\sqrt{1+z'^2}}{z'} \qquad (4)$$

$$R_e=\frac{\sqrt{(1+z'^2)^3}}{z''} \qquad (5)$$

Alignment must be in 4 degrees of freedom, which are x,y as well as rx, ry of the stage. Alignment targets are the 2 tilt components at the two zones (i.e., also 4 targets). A linear system of 4 equations can be established to help perform the alignment. Alignment can be done by measuring the actual tilts (right hand side of the system of equations), and measuring the system "partial reactions", i.e., both tilt components in the two zones (4 outputs $t_{1x}, t_{1y}, t_{2x}, t_{2y}$, for the 4 input values x,y,rx,ry). The solution of the equation delivers the 4 unknown shifts x,y and tilts rx,ry which remove the tilts in the zones. (See measurement set up of FIG. 3)

c. Move the stage to the msteps scan positions defined in the test-plan. Make 2×msteps measurements at the scan positions and store the results; i.e., move the stage by $\Delta w=0.015$ mm between measurement one and measurement two at every scan-position. These measurements are to measure the matrix $d=\Delta q/\Delta w$ as an approximation to $dq/dw$. The matrix q is the average of these two measurements at every scan position.

Figure 6:
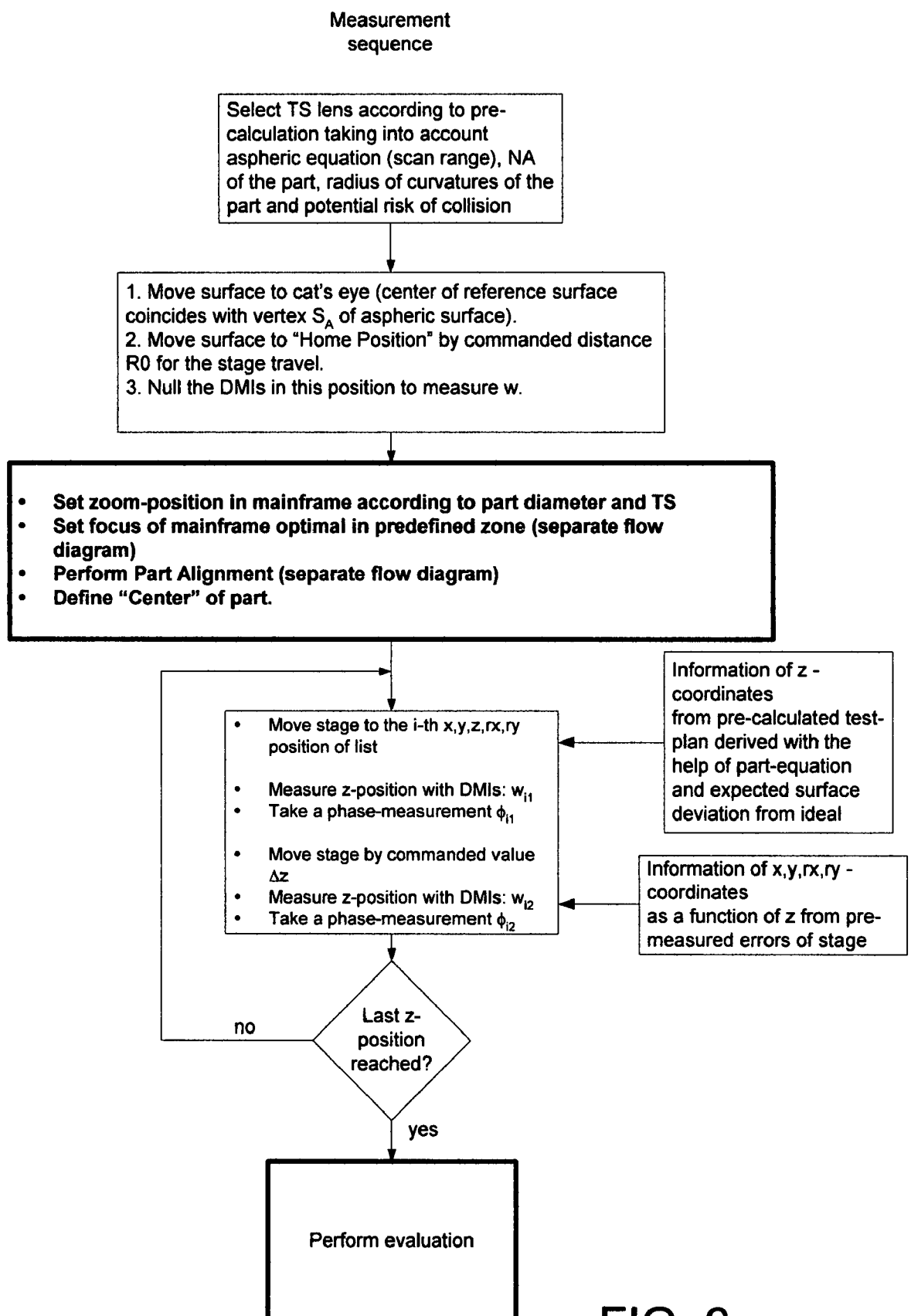
FIG. 6 is a flowchart showing the steps of a "Measurement Sequence" used in practicing the invention where the "Bolded" boxes themselves represent a series of steps carried out in another sequence.
Figure 7:
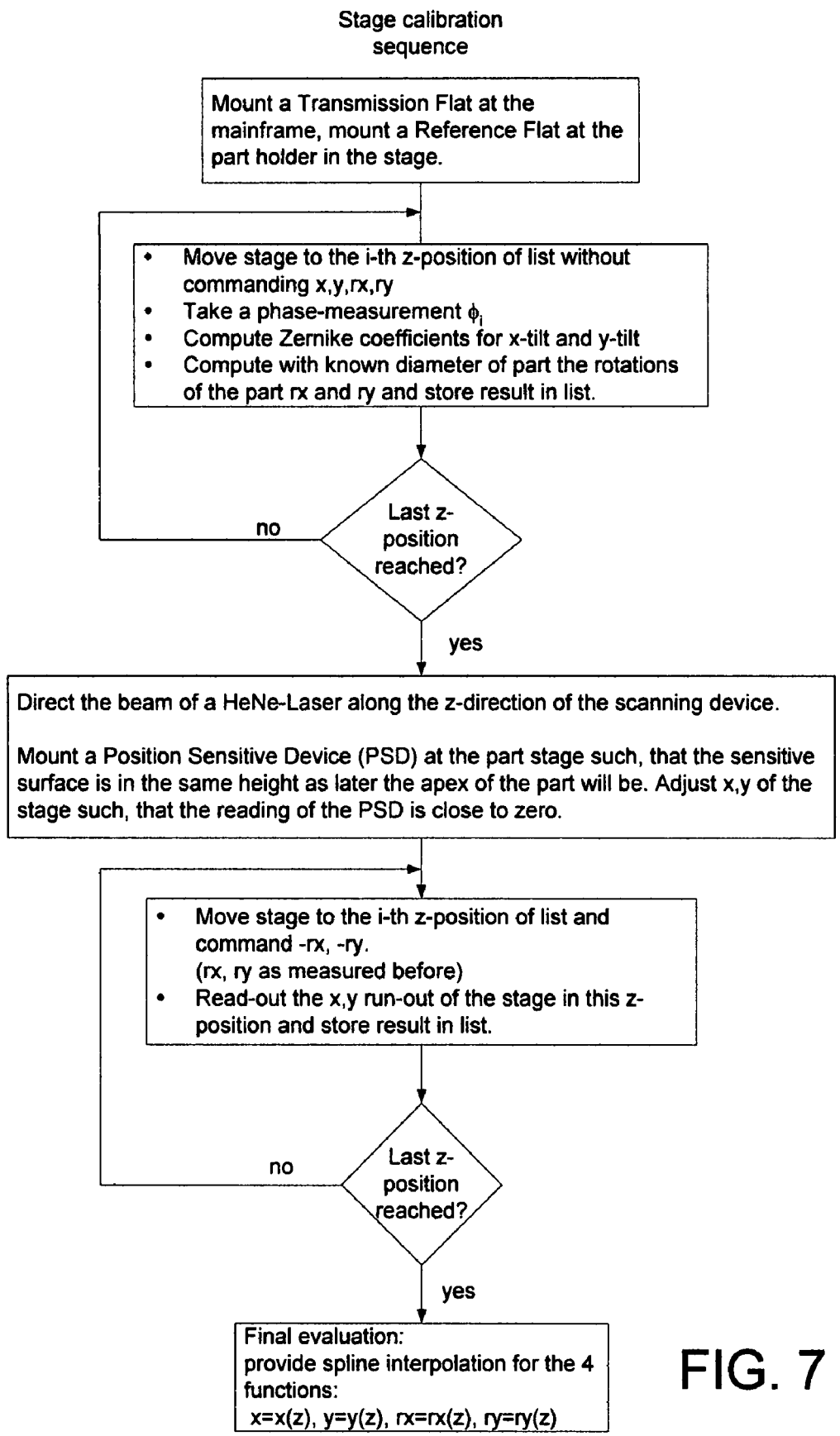
FIG. 7 is a flowchart showing the steps of a "Stage Calibration Sequence" used in practicing the invention.

The measurement sequence is shown in the flow diagram of FIGS. 6, 7, and 8. In this and all following flow diagrams, thick boxes indicate procedures that are explained by a separate flow-diagram.

4. Restriction to 2 Dimensions

In reality, the problem is one of three dimensions, but, for simplicity, and because all important relationships can be described for the two-dimensional case, so the discussion is restricted to 2 dimensions for the time being.

Figure 9:
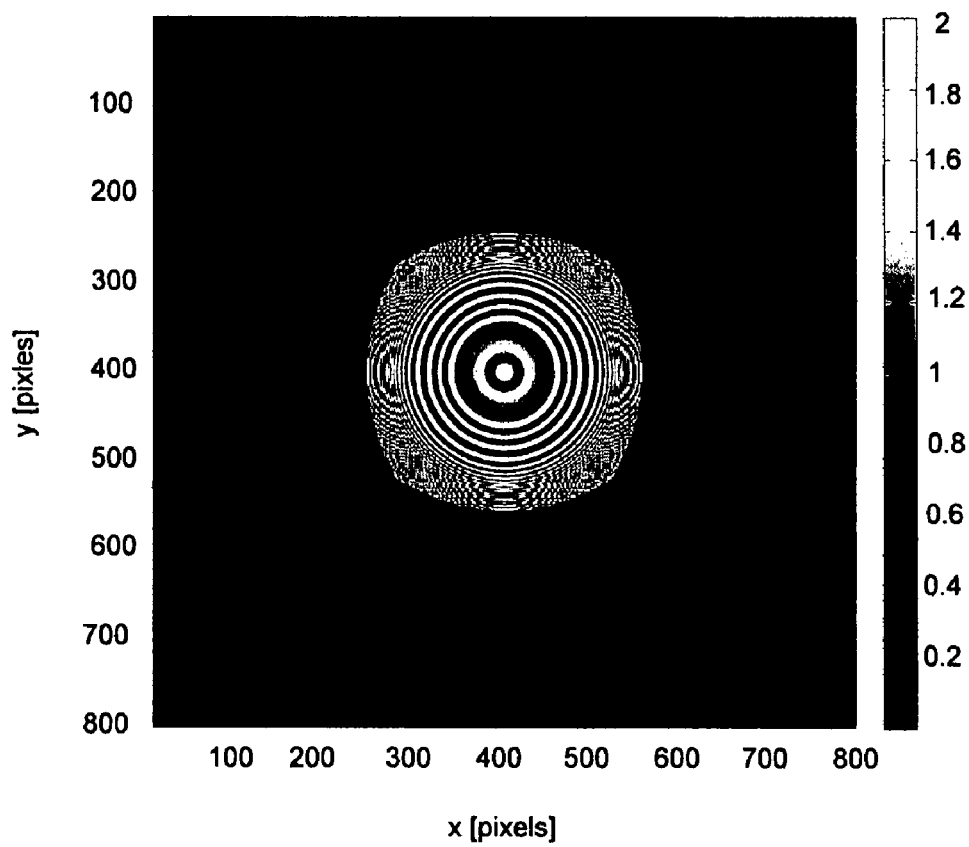
FIG. 9 is an interferogram showing from a phase map of the "home position" of used in practicing the invention.
Figure 10:
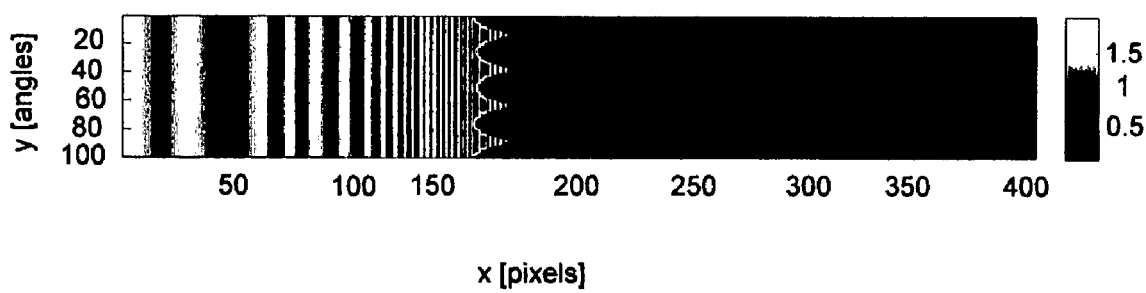
FIG. 10 shows the content of FIG. 9 converted to polar coordinates choosing one "center point" from FIG. 9.

To convert the 3-dimensional measurement to 2-dimensions, we integrate along the $\theta$ direction, i.e. around the scan axis. For this the measured phase-maps at every scan-position are into polar coordinates, as shown in the following FIGS. 9 and 10. Shown in FIG. 9 is an interferogram from the phase-map in the "home-position". The fringes are clipped at 0.5 of the Nyquist-limit with black areas showing non-valid pixels (NaN=not a number). This "mask" is maintained through the complete evaluation. FIG. 10 shows the content of FIG. 9 converted to polar coordinates, choosing one "center point" in FIG. 9. Columns=pixels and lines=azimuthal angles. In this example, no x,y-alignment error was assumed. Therefore, the problem is rotationally symmetric, i.e., all lines are equal. The next step is to integrate along the columns to reduce the problem to two variables.

The next step is to make a Fourier Analysis along every (valid) column, up to the second harmonic of $\theta$. This is done by the following piece of MATLAB code, which works on every column of the matrix H:

```
discreteangles = linspace(0,Zpi.*(ntheta-1)./ntheta,ntheta);
Co1 = cos(discreteangles);
Si1 = sin(discreteangles);
Co2 = cos(2.*discreteangles);
Si2 = sin(2.*discreteangles);
for k = 1:msteps
    MaskH    = ones(ntheta,nrad);
    H(:,:)   = transformtopolar((Q1(:,:,k) +
Q0(:,:,k))./2,ntheta,nrad);
    MaskH(isnan(H(:,:))) = 0;
    q(k,:)      = nanmean(H(:,:));
    qCo1(k,:)   = (Co1(1,:) * (MaskH(:,:).*H(:,:)))./(Co1(1,:).^2
* MaskH(:,:));
    qSi1(k,:)   = (Si1(1,:) * (MaskH(:,:).*H(:,:)))./(Si1(1,:).^2
* MaskH(:,:));
    qCo2(k,:)   = (Co2(1,:) * (MaskH(:,:).*H(:,:)))./(Co2(1,:).^2
* MaskH(:,:));
    qSi2(k,:)   = (Si2(1,:) * (MaskH(:,:).*H(:,:)))./(Si2(1,:).^2
* MaskH(:,:));
end
```

The values qCo1(k,:), qSi1(k,:) are nonzero when the center-point M of the reference surface with radius $R_2$ is not located on the rotational axis of the aspheric surface for this zone. The values qCo2(k,:), qSi2(k,:) are nonzero when either the part has astigmatism or when the center point of the integration is chosen incorrectly; therefore, this can be used to find the best-fitting center, which should be used throughout the evaluation. Details and examples will be given later; in the cases of FIGS. 9 and 10 none of the mentioned complications were simulated.

5. The q-Matrix

Note that the matrix q calculated in the code above contains nrad columns and msteps lines. The number nrad comes from interpolating the phase-maps in the radial direction when transforming to radial coordinates. It is good practice to chose nrad=numpix, where numpix is the number of pixels used to image the surface from 0 to hmax, where hmax is the largest h value measured. msteps is the number of scan positions chosen in the test plan.

The matrix q has interesting features and will be the main point for further discussion. It contains, together with another matrix d, which will be described in Section 7, all the information which is gathered during the measurement.

One line of the matrix q contains the measured distances as visualized in FIG. 2, i.e., for one specific scan position and every valid pixel. One column of matrix q contains the values q as visualized in FIG. 5, i.e., for one specific pixel of the detector during all scan positions where this pixel remains valid.

The matrix q does NOT contain the absolute distances as shown in FIG. 2 or 5, but due to the ambiguity of $\lambda/2$, when distances are measured by interferometry with phase-measurement techniques, only the values of q modulo $\lambda/2$.

This fact is the main problem for further evaluation of the data the solution of which will be shown hereinafter. But for the sake of understanding, it will now be shown how the matrix q should look in a line by line presentation, i.e., for every scan position.

Figure 11:
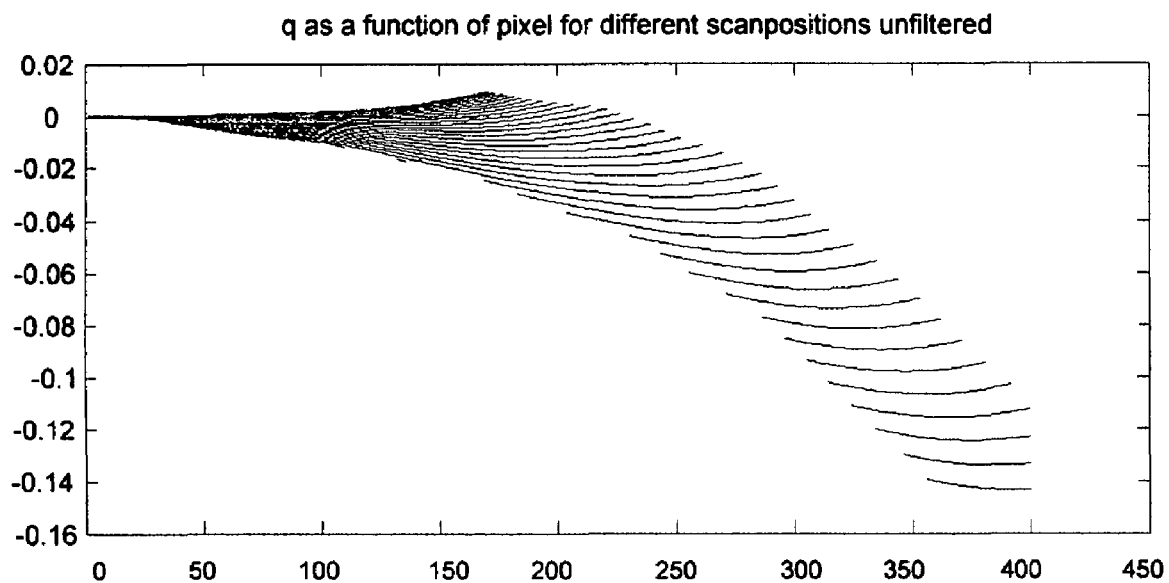
FIG. 11 is a graph for visualizing the q-matrix generated in the process of practicing the invention showing q as a function of pixels for different scan positions unfiltered.

Referring now to FIG. 11 illustrating the q-matrix and carefully looking at it, it can be seen that the lines "spread" out from left to right, i.e., for larger pixel numbers a becomes larger and therefore the "distance" (i.e., difference) between the curves increases. Also, the extreme point in every section of the curves can be seen. If all of the extreme points are connected, then we would see the curve $p=p(h_{pix})$. A number of curves start at zero in pixel number 1 and end somewhere at a certain pixel number. Some of the curves start only at higher pixel values and end also at higher values; these branches are not connected to the center of the part, and therefore, their fringe order number cannot be gained by the phase-unwrapping in the pixel direction starting from the vertex.

6. The Matrix $dq/dh_{pixel}$

Figure 12:
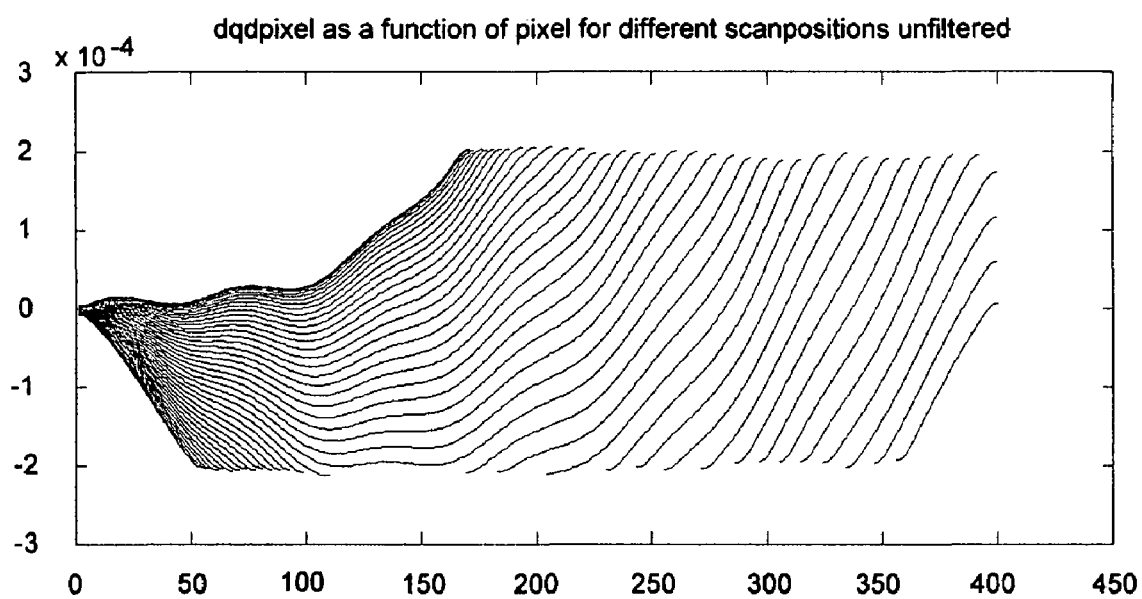
FIG. 12 is a graph for visualizing the matrix $dq/dh_{pixel}$ for every scan position where the abscissa is the pixel number.

The next step in the evaluation is to fit spline functions to every line of q. This is done for "valid data", i.e., the startpoint and the end-point of the fit might be different for every line. Also, if there are "drop outs" in the data, the splines should start at the first valid pixel and end at the last valid pixel, starting again after the dropouts. Next, the spline functions are differentiated; the result being a new matrix which is $dq/dh_{pixel}$ or proportional to $dq/d\alpha$. See FIG. 2 illustrating the meaning $dq/d\alpha$. It is recognized that q has extreme values for the values of $\alpha$ where the line from M to Q is normal to the surface. But this means, that $dq/d\alpha=0$ there. FIG. 12 shows the matrix $dq/dh_{pixel}$, which is proportional to $dq/d\alpha$; both matrixes having the same zero positions. In FIG. 12, the matrix $dq/dh_{pixel}$ is shown for every scan position. The abscissa is the pixel number. It is important: to point out that this matrix does not suffer from unknown fringe order numbers.

It is also important to recognize that the matrix $dq/dh_{pixel}$, computed from MEASURED data, also looks like what is shown in FIG. 12 because these values do NOT suffer from the fact that the integer fringe order number is missing. As q was differentiated, the unknown constant was dropped together with every constant in the function.

In the example shown in FIG. 12, a certain "waviness" appears in the data, especially for low pixel numbers. This stems from an assumed error on the surface which shows this waviness. The interpretation is that, for several $\alpha$ values, "normal incidence" to the surface was given.

Figure 13:
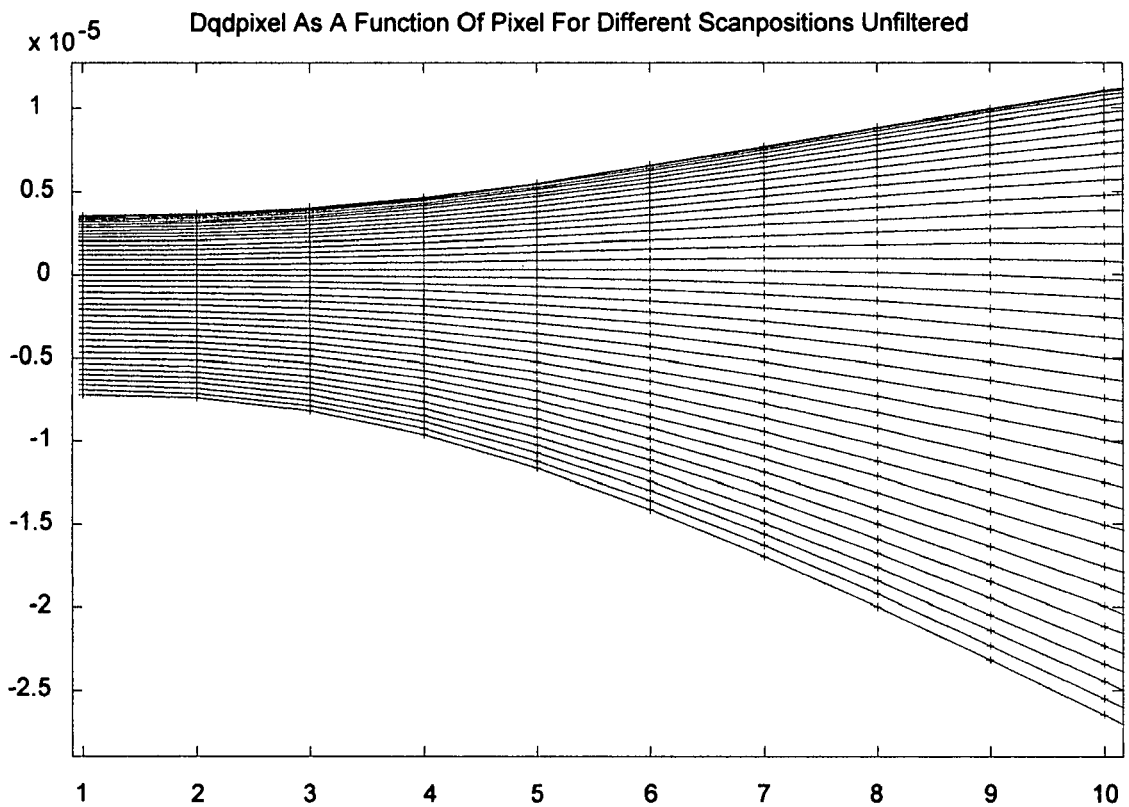
FIG. 13 is a graph for visualizing an enlarged portion of the matrix of FIG. 12 for the first 10 pixels.

FIG. 13 shows an enlarged portion of FIG. 12 for the first 10 pixels. A search for zeros in these curves is made; but instead of looking where the curves cross the zero line (i.e., where the pixel is located for which the ray had normal incidence), the zero-crossing of every pixel in scan-direction is searched for. This location will, in general, be between two scan-positions. In the example given, the solution is unique for every pixel; this must not necessarily be the case and the principle is not changed if there are multiple zero-crossings for different scan positions at the same pixel (→for instance for complex severe aspheres). The technique applied in the program is as follows: Search for a change of sign for the values at one pixel, starting with scan position 1. When a sign-change is observed, it is seen if the 2 scan-positions before and behind the sign-change (i.e. zero) have the same sign. If this is the case, a polynomial of order 3 is fitted through the 4 points, and the zero of this polynomial is computed. It is quite remarkable that, even for the center of the asphere, the zero-crossing can be found very robustly.

Figure 14:
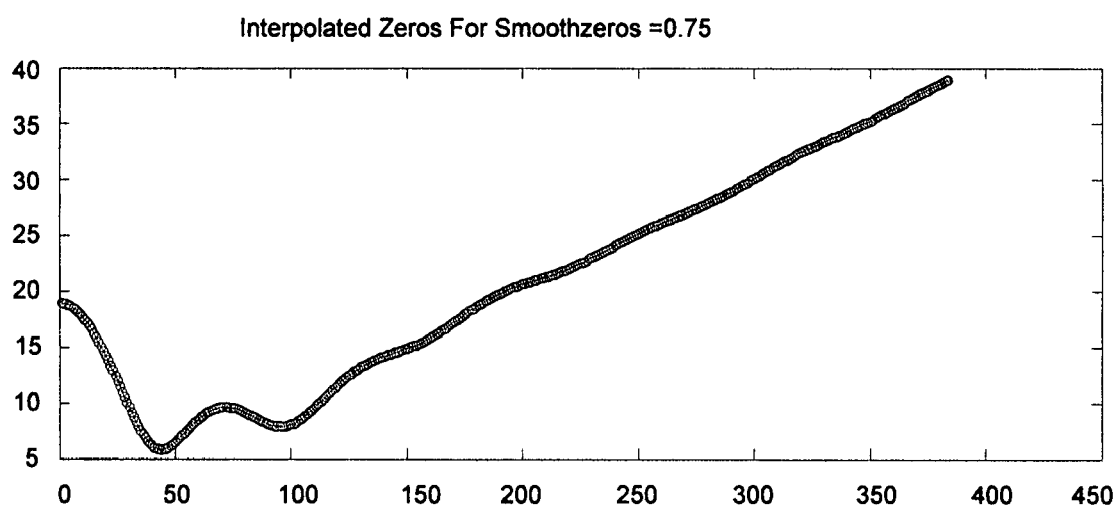
FIG. 14 is a graph showing the positions of zeros in the matrix $dq/dh_{pixel}$ for every pixel; the zeros being between the used scan positions.

Reference is now made to FIG. 14 which shows the location of the computed zeros in the matrix $dq/dh_{pixel}$ for every pixel location, the zeros being between the used scan positions. It is seen that in the center of the part, the "red circle" condition was reached at a scan position in the vicinity of scan-position 19. Because of severe errors on the part surface (waviness), this would be the "home-position" for this part, and $R_0$ should be corrected. Because the part is near spherical at the center, it can be stated that weak aspherical surfaces also cause no problem with this method. This method of searching for the zeros in the function $dq/dh_{pixel}$ in the scan direction replaces the troublesome location of the "red circle".

Note that the process can be made more "robust", but at the expense of a loss of spatial resolution for the measurement result. The way to make the process robust is to fit "smoothing splines" to q in line direction, before further mathematical steps are taken. It has not been observed that this is needed, but it could be helpful in cases exhibiting severe measurement noise to get a robust result. This is an option, not a necessity.

7. The Matrix dq/dw

Figure 15:
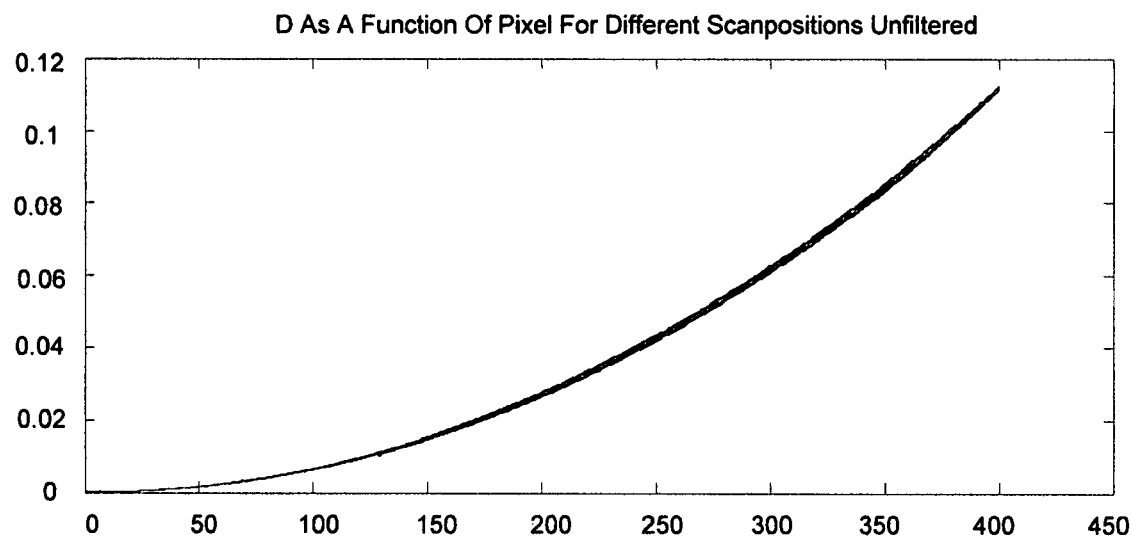
FIG. 15 is a graph of the matrix $d=\Delta q/\Delta w$ as measured by shifting w by $\Delta w=0.015$ mm and measuring the resultant $\Delta q$.

From FIG. 14, the scan position is known for every pixel where the rays were normal to the surface. Now, it is desired to know, in addition, the angles $\alpha$ in object space, which can be gained from the measurement described in Section 3: At every scan position two measurements are made with a change of $\Delta w=0.015$ mm, for instance. The values $\Delta q$ which are measured for the two near-by scan positions can be sewn together with $\Delta w$ to establish an approximation to $dq/dw=d$. This means d is a new matrix that is derived from these difference measurements at every scan position. The new matrix d is shown in FIG. 15 for all pixels. Every single curve in d represents the result for a certain scan position w. It is remarkable that the curves for the 40 scan positions investigated in this example are so close together. This might not be so extreme for other aspheric surfaces, but it is believed that dq/dw does not principally change very much with w. Assuming this is true, then it is not necessary to make an additional measurement at every scan position to get dq/dw. The values can easily be interpolated.

Now, the values in d for every pixel are read out at the interpolated scan-position, where the zeros in the matrix $dq/dh_{pixel}$ were found. For this, interpolation between the curves is made again. This interpolation can be done by using a fit to a third-order polynomial with the 4 points nearest to the intermediate scan position. From these interpolated values, we then calculate:

$$\sin \alpha_{ij} = \sin(arccos(1-d_{ij})) \quad (6)$$

Figure 16:
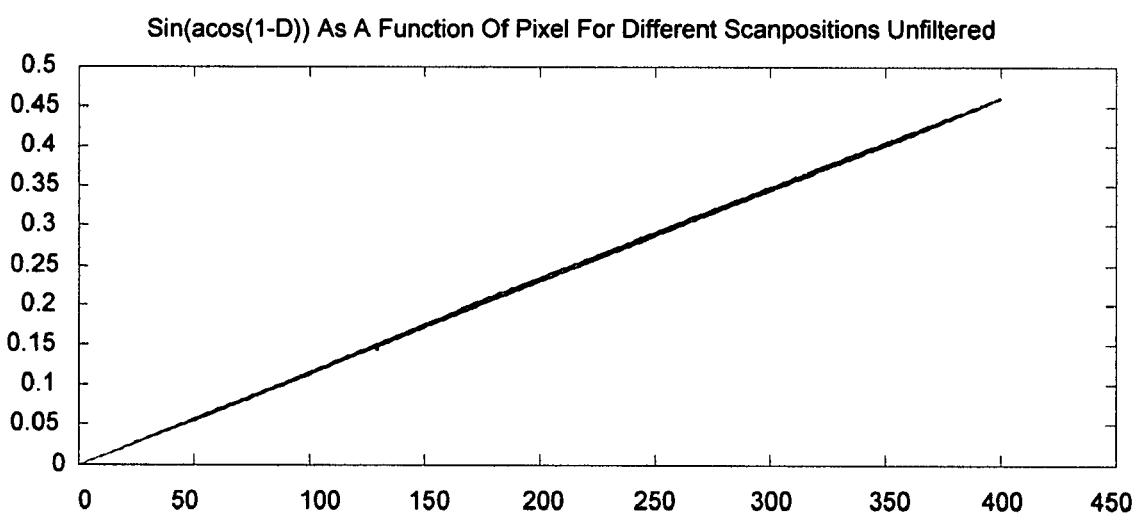
FIG. 16 is a graph for visualizing the matrix $\sin(\arccos(1-d))$ used in practicing the invention.

Reference is now made to FIG. 16 which shows the matrix sin(arccos(1-d)).; if the values at the scan positions for the zeros in FIG. 14 are taken, then the associated values for $\sin\alpha$ for every pixel are obtained. It is remarkable how dense the 40 scan-positions are together. Consequently, it must be concluded that it does not really matter with which scan position a is measured which results a savings in the number of measurements that need to be made.

8. The function $M(h_{pix})$

The functions:

$$M(h_{pix}) = \frac{h_{pix}}{\sin\alpha} = a_0 + a_2 \cdot h_{pix}^2 + a_4 \cdot h_{pix}^4 + a_6 \cdot h_{pix}^6 \quad (7)$$

$$M(\sin\alpha) = \frac{h_{pix}}{\sin\alpha} = b_0 + b_2 \cdot \sin^2\alpha + b_4 \cdot \sin^4\alpha + b_6 \cdot \sin^6\alpha \quad (8)$$

"bridge" the phase-maps measured on the detector in pixel coordinates with the associated aperture angles of the chief rays imaging this point in the Fizeau cavity. It is the goal to experimentally find the functions M using data from the measurement because then it is known that there is no discrepancy with what is observed. Because the optics in the imaging system are all "smooth", it can be concluded that the function M will have no large gradients. Measured data-points for the function M at every pixel are obtained from the knowledge of the scan positions where the matrix $dq/dh_{pixel}$ has zeros, and from the values of the matrix $d=dq/dw=1-\cos\alpha$ for these scan positions at every pixel, but, in addition, a low order polynomial is fit to these values to "smooth" the result and suppress experimental noise. As as result M cab be regarded as highly accurate.

As can be seen in Eq. (7) and (8), the fit is to be done twice, once to get M as a function of the pixel coordinates, which then allows calculation with the help of M, the associated angle in object space, and once where M is a function of the angle in object space, which then allows to get the pixel coordinates for a given angle.

When fitting M to the data-points, a weighting function $\gamma$ should be used. This is given as in Eqs. (3), (4) and (5):

$$\gamma = 1 - |R/R_e|$$

$$R = h \cdot \frac{\sqrt{1+z'^2}}{z'}$$

$$R_e = \frac{\sqrt{(1+z'^2)^3}}{z''}$$

For these quantities, the design equation can be used. They are not quite ready in this form, because they first must be expressed as functions of $\alpha$. But as it is from the design equation, changes between variables can always be managed.

The magnification function can be achieved with the help of the "differential" measurements where, for every scan position w, another measurement is made with scan position $w+\Delta w$, as described before. As shown in FIG. 16, $\sin(\alpha)$ as a function of pixel coordinate $h_{pix}$, is obtained, i.e., can establish the magnification functions according to (1) and (8). But at the center of the part, the measured values of q are all connected, so it is possible with this knowledge to derive M directly there. In addition, a rough guess of M is possible by looking for the most outer zone of the part and calculating the $NA_{max}=\sin(\alpha_{max})$, for this zone from the design asphere. Then the position of this zone on the camera is studied, which gives us in addition the value for $h_{pixmax}$. Putting both together, an initial rough estimate on M is found, which is $M \sim h_{pixmax}/NA_{max}$.

Figure 17:
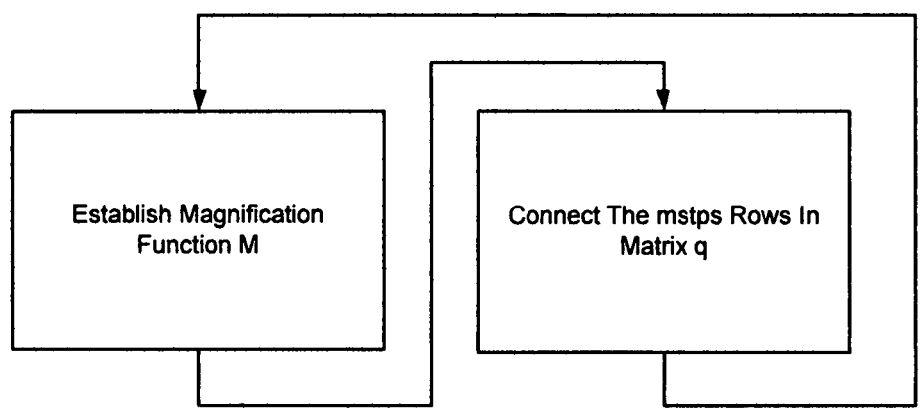
FIG. 17 is a high level diagram illustrating the connect-algorithm used in practicing the invention.

The knowledge of M is needed for the connect algorithm, which is described in the next section. On the other hand, if the values of the matrix q are all "connected", i.e., the ambiguity of integer multiples of $\lambda/2$ is removed, then there is the possibility to achieve M out of the matrix q itself. This "egg and chicken" problem can be solved when the knowledge of M as a function of $h_{pix}$ is iteratively/sequentially refined, and connect the values in q, which also provides new usable information for higher values of $h_{pix}$. The connect-algorithm in any case solves the problem of unknown integer multiples of $\lambda/2$ from the center to the outside of the part. This sequential and iterative approach is symbolically shown in the diagram shown in FIG. 17.

Iterative/sequential approach to solve Connect- and Magnification-Problem simultaneously.

Reference is now made to FIG. 18 which showing a flow-diagram to a second approach to establish the knowledge of the Magnification function. The idea behind this algorithm is that the SAME parts of the surface are measured in different scan positions. To reconstruct the points of the surface from the measured positions and values q in the images, the CORRECT knowledge of M is needed. If M is slightly wrong, the reconstructed points do not lay on the measured surface, but deviate. The problem is now solved by assuming a value for M and doing the reconstruction. For two different zones, clouds of points are obtained which, for every zone, can be connected by an interpolating spline function, thus creating a "surface". Now the distance between these surfaces can be measured, for instance in z-direction. The square root of the sum of squares of these measured distances is now a quality number which can act as a merit function for an optimization procedure to find the coefficients establishing the M-polynomial. This procedure is shown in detail in the flow-diagram of FIG. 18.

9. The Connect Algorithm

Figure 19:
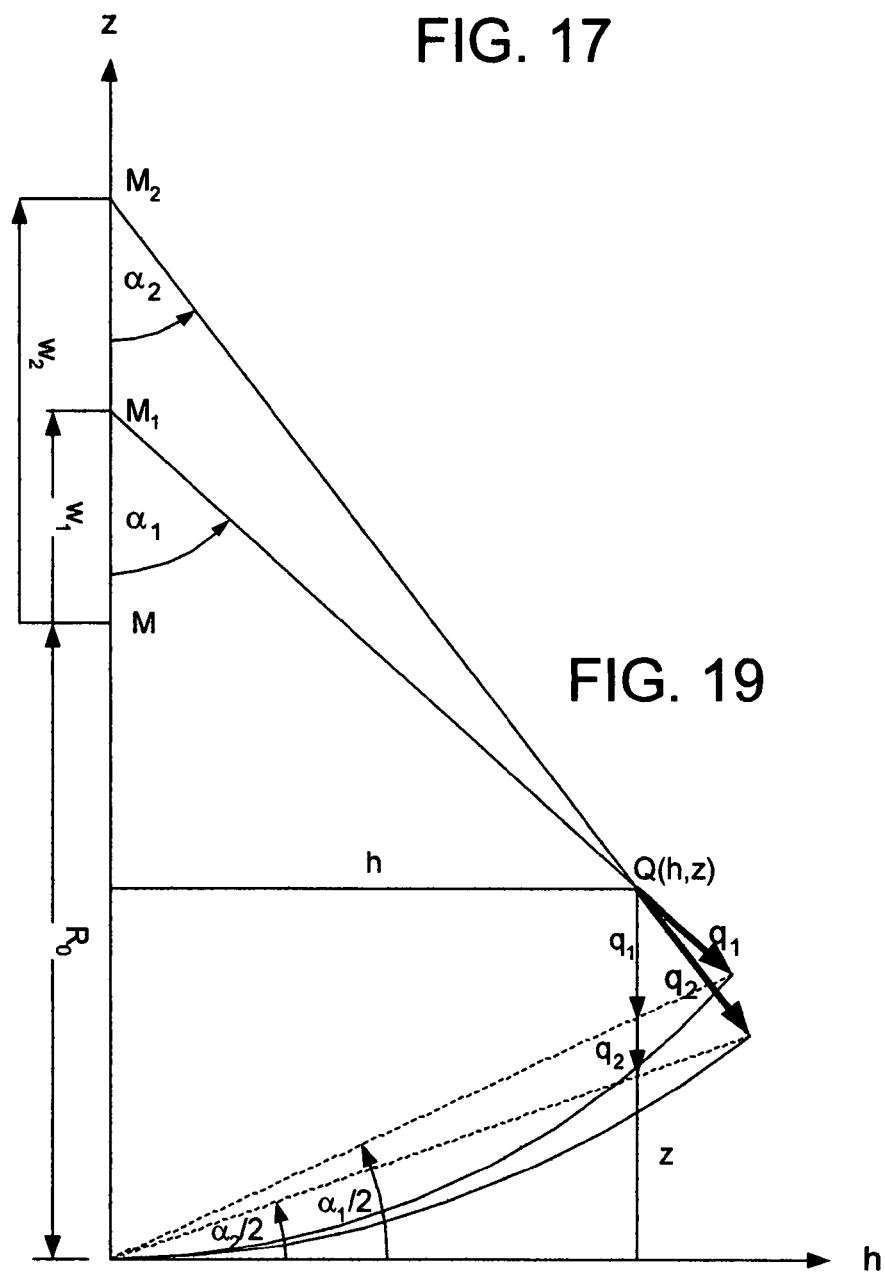
FIG. 19 is a diagram illustrating various parameters used in the "connect-algorithm" of the invention.

Reference is now made to FIG. 19 where point Q is defined by the known quantities $(R_0+w_1)$, $\alpha_1$, $q_1$; with $w_2$, $q_2$ and $\alpha_2$ can be computed. With M, the image coordinate associated with $\alpha_2$ can be determined and finally the integer fringe order number best fitting the measured fringe fraction $e_2$ and the calculated value $q_2$ obtained.

Point Q(h,z) is common to both positions $w_1$ and $w_2$; $q_1$, $q_2$ are the measured values at THIS point. It is assumed that $q_1$ is absolutely known, i.e., including the fringe order number $N_1$, i.e. no ambiguity of $N_1 \cdot (\lambda/2)$. It is further assumed that, for $q_2$, only the fringe fraction $e_2$ is known, i.e. the additional length $N_2 \cdot (\lambda/2)$ is unknown, in particular the integer fringe order number $N_2$ is unknown. It is:

$$q_2 = N_2 \frac{\lambda}{2} + e_2. \tag{9}$$

The task is to find the order number $N_2$ as well as the position in camera coordinates where to read out $e_2$.

From the known quantities $R_0$, $w_1$, $\alpha_1$ ($\alpha_1$ from Eq. (8)), h and z of the point $Q(h,z)$ are computed:

$$h = (R_0 + w_1 - q_1) \cdot \sin \alpha_1 \tag{1}$$

$$z = (R_0 + w_1) - (R_0 + w_1 - q_1) \cdot \cos \alpha_1 \tag{2}$$

Now we compute what $q_2$ should be, when scan-position $w_2$ is used:

$$q_2 = (R_0 + w_2) - \sqrt{h^2 + (R_0 + w_2 - z)^2} \tag{10}$$

In addition we compute $\sin(\alpha_2)$:

$$\sin \alpha_2 = \frac{h}{R_0 + w_2 - q_2} \tag{11}$$

As we know M as a function of $\sin(\alpha)$, eq. (8), we can compute the pixel number associated with $\sin(\alpha_2)$:

$$h_{pix2} = M(\sin \alpha_2) \cdot \sin \alpha_2 \tag{12}$$

$h_{pix2}$ will be not an integer pixel number; therefore we have to interpolate between two pixels. This interpolation should be a higher order one (using more than 2 pixels). With the value of $e_2$ read from the phase-value at the computed location $h_{pix2}$ and the computed value for $q_2$ after Eq. (10) we now can compute the order number:

$$N_2 = \text{round}\left(\frac{2 \cdot (q_2 - e_2)}{\lambda}\right) \tag{13}$$

Figure 20:
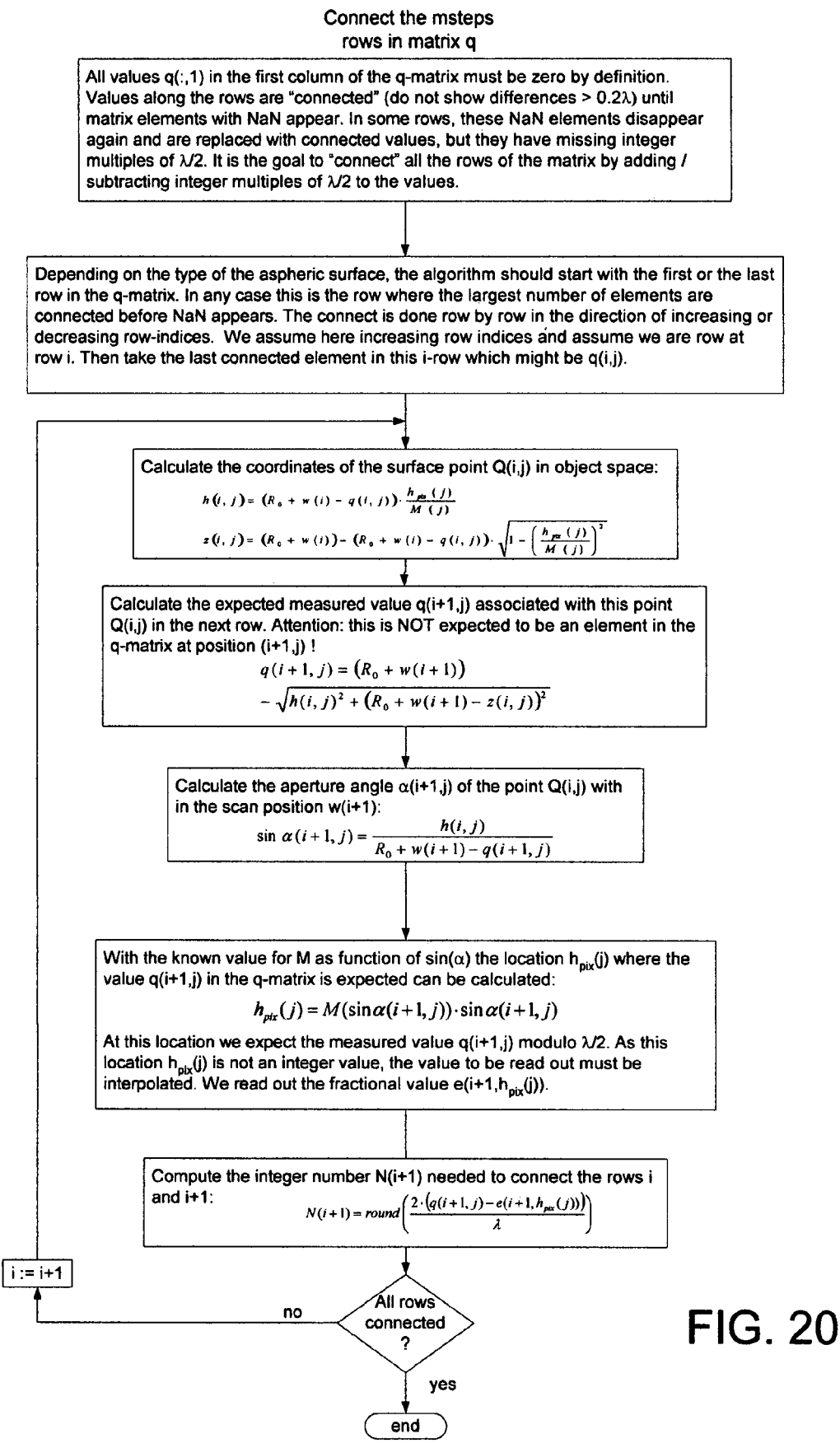
FIG. 20 is a flowchart showing the steps of a "Connect the msteps rows in matrix q" sequence used in practicing the invention.

The flow diagram of FIG. 20 shows these steps in detail.

10. Reconstruction of the Design Surface to Derive $\Delta q$

Now, the question of how to compare the measurement result with the design equation to get the errors $\Delta q$ of the part will be discussed. Whereas all calculations so far have been derived for the 2-dimensional case, 3 dimensions must now be considered.

Through the image coordinates $x_{pix}$, $y_{pix}$ of the object coordinate system $x_R$, $y_R$ (center of coordinate system is coincident with the center point M of the reference surface) and through the function M (Eqs. (7) and (8)), the azimuthal angle is derived as:

$$\theta = a\tan 2(y_{pix}, x_{pix}) \tag{14}$$

and the aperture angle $\alpha$.

With the measured quantities $(R_0+w)$ and $q_m$, the coordinates of the measured point of the aspheric surface can be calculated to be:

$$x_m = (R_0 + w - q_m) \cdot \sin \alpha \cdot \cos \theta - \Delta x \tag{15a}$$

$$y_m = (R_0 + w - q_m) \cdot \sin \alpha \cdot \sin \theta - \Delta y \tag{15b}$$

$$z_m = (R_0 + w) - (R_0 + w - q_m) \cdot \cos \alpha \tag{15c}$$

Now, the associated point on the design surface has to be found to be able to derive the surface error. This comparison should be done using the same angle $\alpha$ in object space, i.e., the design values $h_d, z_d$ must be found using $\alpha_m$.

Figure 21A:
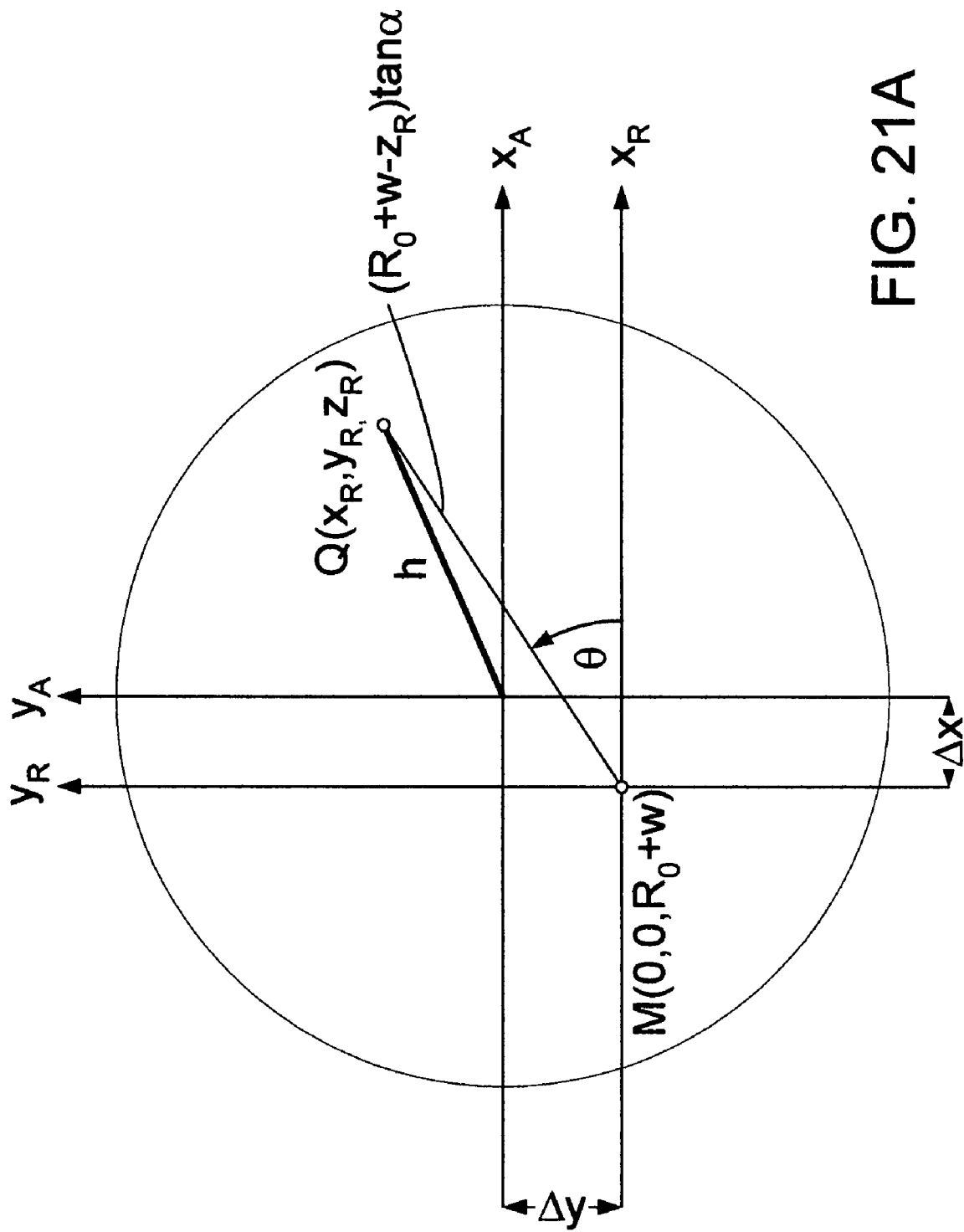
FIGS. 21a and 21b are diagrams of the various parameters involved in linking detector space coordinates with those in object or "test" space.
Figure 21B:
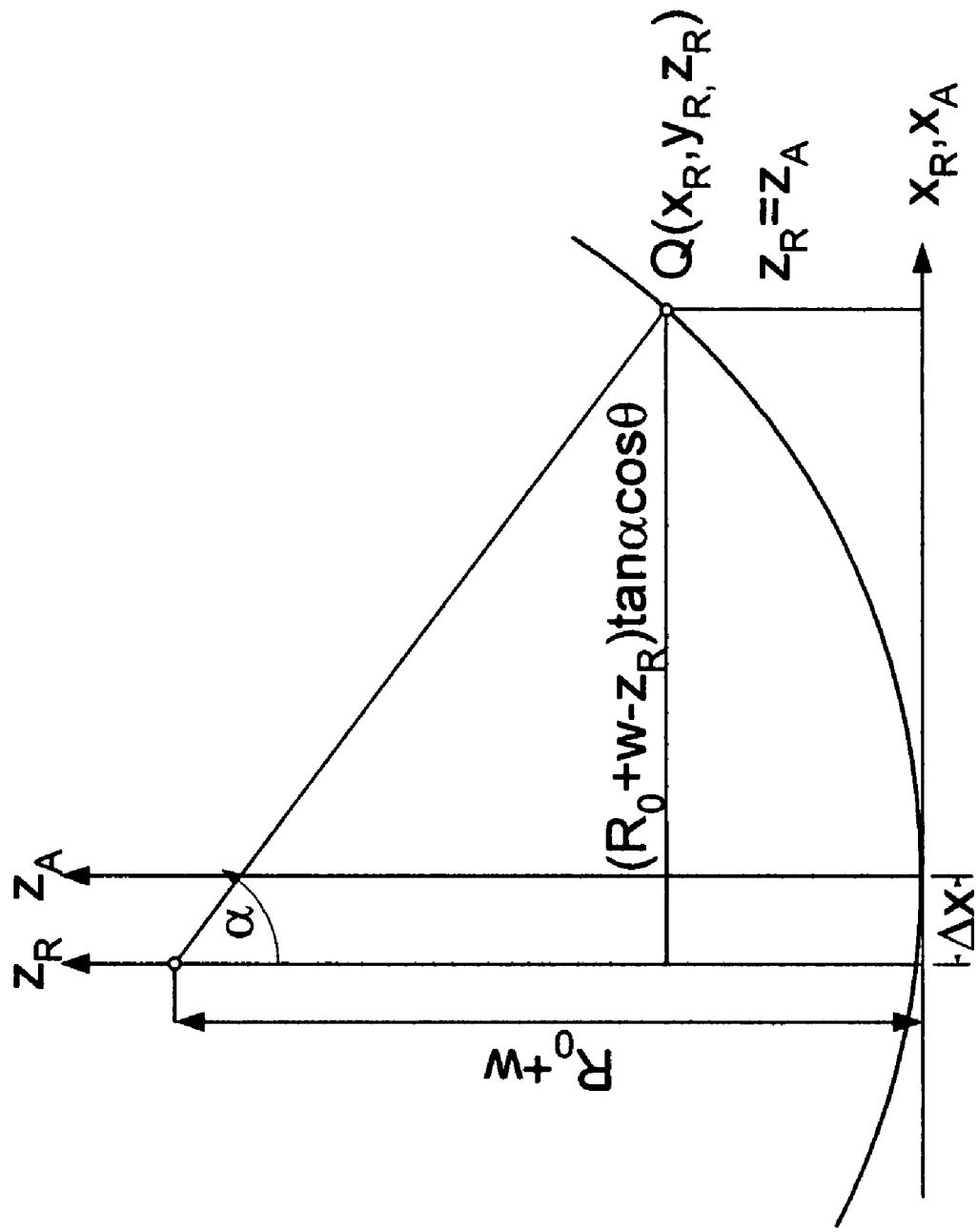

Referring to FIGS. 21a and 21b where FIG. 21a is a view from top onto the part to be measured. M is the center point of the reference surface; Q is the point of the aspheric surface, where the "line of sight" with angle $\alpha$ intersects the aspheric surface. The projection of the line of sight onto the x,y plane has a length $(R_0+w-z_R)\tan \alpha$. With respect to coordinate systems, measurements are made in detector coordinates which is an image of the object coordinates. This is coupled through the TS lens characterized by center point M of reference surface with coordinate system $x_R$, $y_R$, $z_R$.

As the real aspheric surface with its coordinate system $x_A$, $y_A$, $z_A$ is shifted laterally from its ideal location by $\Delta x$, $\Delta y$ during the measurement, the measurement data contain misalignment coma terms $\sin(\theta)$, $\cos(\theta)$.

From the data, the coma-terms $\sin(\theta)$, $\cos(\theta)$ are extracted, and with this $\Delta x$, $\Delta y$ is reconstructed. Now, use is made of the SAME position for the center point M of the reference surface during the calculation of the reference data as was used during measurement, thus compensating the effect of misalignment for the computed surface error $\Delta q$. This error is not normal to the surface, but very close to normal; when q=p, w=v, then the error becomes normal. i.e., $\Delta q = \Delta n$; this is true for the zero-crossings.

The reference data is gained at the design asphere, which is assumed now to be "measured". So now, calculation is made of where the line of sight, defined by the angle $\alpha$ as well as by $\theta$ and $R_0+w$, hits the design surface. In the intrinsic aspheric coordinate system (in which the design equation z=z(h) is defined), the point Q is defined by h and z. Therefore, the calculation of point Q needs to be iterative. The value of h has to be found which satisfies, at the same time, the aspheric design equation z=z(h) and the lengths of the projection of the line of sight. The following equations give the relationships in detail:

$$z_A = z(h_A) \tag{16}$$

$$x_R = (R_0 + w - z_A) \cdot \tan \alpha \cdot \cos \theta \tag{17a}$$

$$y_R = (R_0 + w - z_A) \cdot \tan \alpha \cdot \sin \theta \tag{17b}$$

$$x_A = x_R - \Delta x = (R_0 + w - z_A) \cdot \tan \alpha \cdot \cos \theta - \Delta x \tag{18a}$$

$$y_A = y_R - \Delta y = (R_0 + w - z_A) \cdot \tan \alpha \cdot \sin \theta - \Delta y \tag{18b}$$

$$h_A^2 = x_A^2 + y_A^2 \tag{19}$$

$$q_d = \sqrt{(R_0+w)^2 + \Delta x^2 + \Delta y^2} - \sqrt{h_A^2 + (R_0+w-z_A)^2} \tag{20}$$

$$\Delta q(x_A, y_A) = q_m - q_d \tag{21}$$

Alternatively (may be more precise in case that $\Delta x$, $\Delta y$ is not totally correct):

$$\Delta q(x_A, y_A) = \sqrt{(x_A - x_m)^2 + (y_A - y_m)^2 + (z_A - a_m)^2} \tag{22}$$

When introducing eq. (15) as well as eq. (16) to (19) into eq. (22), the following much simpler equation (23) results:

$$\Delta q(x_A, y_A) = \frac{R_0 + w - z_A}{\cos \alpha} - (R_0 + w - q_m) \tag{23}$$

$z_A = z(h_A)$ must be derived iteratively using (18) and (19) to get $h_A$.

For the following the indices A and d are used for the same quantities. A means Aspheric surface, d means design surface. p The connection is needed between $\alpha$, $h_d$ and $z_d$, for a given aspheric equation $$z_d = z_d(h_d).$$

$$\alpha(h_d) = \arctan\left(\frac{h_d}{R_0 + w - z_d(h_d)}\right)$$

$$\tan\alpha(h_d) = \frac{h_d}{R_0 + w - z_d(h_d)}$$

The inverse function hd can only be derived numerically by, for instance, using Newton's method: p A function $f(h_d)$ is established for which the value hd that makes this function equal to zero is searched:

$$f(h_d) = h_d + z_d(h_d) \cdot \tan\alpha - (R_0 + w) \cdot \tan\alpha = 0$$

First derivative:

$$\frac{df(h_d)}{dh_d} = 1 + z'_d(h_d) \cdot \tan\alpha$$

Newton:

$$h_d := h_d - \frac{h_d - (R_0 + w - z_d(h_d)) \cdot \tan\alpha}{1 + z'_d(h_d) \cdot \tan\alpha}$$

The surface error $\Delta z$ in z-direction is:

$$\Delta z(x_A, y_A) = \Delta q(x_A, y_A) \cdot \cos\alpha = (R_0 + w - q_m) \cdot \cos\alpha - (R_0 + w - z_A) \quad (24)$$

From these quantities, the following are known from the measurement:

$\alpha$ from the known equation for M and the pixel location from which we take q $\theta$ from Eq. (14)

$\Delta x$, $\Delta y$ from Fourier analysis of every column of matrix H, see program-code, Page 15

$R_0 + w$ from measurement $z_A$ from design equation

It can be seen, that the critical quantity is $h_A$, which must be calculated using Eqs. (18) and (19); but (18) contains $z_A$, which can only be calculated knowing $h_A$. Therefore, the values for $x_A$, $y_A$, $h_A$, $z_A$ must be derived by an iteration. Use of the Newton method is used as seen from the following portion of a Matlab routine.

```
function [h,z,zs,zss,q,i] = findhforgivenalphaandw(w,t,theta, ...
                            dx,dy,curvature,conic,withoddcoefficients,hmax,
                            ...
                            PVzer,powercoef,amplitude,frequency);
% t = tan(alpha)
% w = scan
% R0 = 1/curvature
% q is the OPD for that point, i.e. the optical path difference back and forth
% MK 10.05.2006
R0 = 1./curvature;
h = abs(R0+w).*t./sqrt(1+t.^2);   % this h is on a circle with radius R0+w?
if h < 1.e-2
    [z1,zs1,zss1,zsss1] = withoddzzszsszsss(h,curvature,conic,withoddcoefficients);
    if PVzer == 0
        z = z1
        zs = zs1;
        zss = zss1;
    else
        [zerr1,zserr1,zsserr1] = createerrorinznew(h, ...
                                 hmax,PVzer,powercoef,amplitude,frequency);
        z = z1+zerr1;
        zs = zs1+zserr1;
        zss = zss1+zsserr1;
    end
    q = 0;
    i = 0;
else
    q1 = 0;
    co = cos(theta);
    si = sin(theta);
    for i = 1:12
        [z1,zs1,zss1,zsss1] = withoddzzszsszsss(h,curvature,conic,withoddcoefficients);
        if PVzer == 0
            z = z1;
            zs = zs1;
            zss = zss1;
        else
            [zerr1,zserr1,zsserr1] = createerrorinznew(h,hmax, ...
                                     PVzer,powercoef,amplitude,frequency);
            z = z1+zerr1;
            zs = zs1+zserr1;
            zss = zss1+zsserr1;
        end
```

-continued

```
           f = ((R0+w-z).*t*co-dx).^2+((R0+w-z).*t.*si-dy).^2-h.^2;
           fs = -2.*((R0+w-z).*t.*co-dx).*zs.*t.*co-2.*((R0+w-z).*t.*si-dy).*zs.*t.*si-2.*h;
           fss = 2.*zs.^2.*t.^2.*co.^2-2.*((R0+...
                            w-z).*t.*co-dx).*zss.*t.*co+2.*zs.^2.*t.^2.*si.^2....
                            -2.*((R0+w-z).*t.*si-dy).*zss.*t.*si-2;
           delta = -f./fs;
           delta = -f./fs - (0.5.*fss./fs).*delta.^2;
           delta = -f./fs - (0.5.*fss./fs).*delta.^2;
           delta = -f./fs - (0.5.*fss./fs).*delta.^2;
           h = h + delta;
           q = 2.*(sqrt((R0+w).^2+dx.^2+dy.^2) - sqrt( (R0+w-z).^2 + ((R0+w-z).*t*co).^2+...
                                                              ((R0+w-z).*t*si).^2));
           deltaq = q1-q;
           q1 = q;
           if abs(deltaq) < 1.e-12 || abs(delta) < 1e-12 || abs(h) < 1.e-3
               [z1,zs1,zss1,zsss1] =
withoddzzszsszsss(h,curvature,conic,withoddcoefficients);
               if PVzer == 0
                   z = z1;
                   zs = zs1;
                   zss = zss1;
               else
                   [zerr1,zserr1,zsserr1] = createerrorinznew(h, ...
                                             hmax,PVzer,powercoef,amplitude,frequency);
                   z = z1 + zerr1;
                   zs = zs1 + zserr1;
                   zss = zss1 + zsserr1;
               end
               q = 2.*(sqrt((R0+w).^2+dx.^2+dy.^2) - sqrt((R0+w-z).^2 + ((R0+w-
z).*t*co).^2+...
                                                                         ((R0+w-
                                                                    z).*t*si).^2));
               break
           end
       end
   end
end
return
function [z,zs,zss,zsss] = withoddzzszsszsss(h,curvature,conic,withoddcoefficients);
warning off all;
nmax = length(withoddcoefficients);
habs = abs(h);
% coefficients start at h2 and end at h20 (vector with 20 elements)
%       h1        h2       h3       h4       h5
%       h6        h7       h8       h9       h10
%       h11       h12      h13      h14      h15
%       h16       h17      h18      h19      h20]
% withoddcoefficients=
%      [  0         0       -2.70E-5     4.777E-6      0 ...
%       3.1245E-9   0       -1.2368E-12    0         -3.3971E-15 ...
...
%        0       -1.6057E-17    0        -4.1171E-21    0
...
%        0         0         0         0       0];
% The coefficients order number are equal the power of h
z   =           withoddcoefficients(nmax).*habs;
zs  =      nmax.*withoddcoefficients(nmax).*habs;
zss =    (nmax-1 ).*nmax.*withoddcoefficients(nmax).*habs;
zsss= (nmax-2).*(nmax-1).*nmax.*withoddcoefficients(nmax).*habs;
for i = nmax-1 : -1 : 1
    z = (z + withoddcoefficients(i)) .*habs;
end
for i = nmax-1 : -1 : 2
    zs = (zs + i.*withoddcoefficients(i)) .*habs;
end
for i = nmax-1 : -1 : 3
    zss = (zss + i.*(i-1).* withoddcoefficients(i)) .*habs;
end
for i = nmax-1 : -1 : 4
    zsss = (zsss + i.*(i-1).*(i-2).* withoddcoefficients(i)) .*habs;
end
% now the last one
z    = z + curvature.*habs.^2./(1+sqrt(1-(1+conic).*curvature.^2.*habs.^2));
zs   = zs + withoddcoefficients(1) + curvature.*habs./sqrt(1-
(1+conic).*curvature.^2.*habs.^2);
zss  = zss + 2.*withoddcoefficients(2) + curvature./(1-
(1+conic).*curvature.^2.*habs.^2).^(3./2);
zsss = zsss +6.*withoddcoefficients(3) + 3.*(1+conic).*curvature.^3.*habs./(1-
(1+conic).*habs.^2.*curvature.^2).^(2.5);
zs   = zs.*sign(h);
```

-continued

```
zsss = zsss.*sign(h);
return
function [zerr,zserr,zsserr] = createerrorin-
znew(h,hmax,PV,powercoef,amplitude,frequency);
% h and zerr are vectors containing the coordinates of the errors in z
% MK 09.05.2006
Zpi=2.*pi;
her = h./hmax;
zer = powercoef(1).*her.^2 + powercoef(2).*her.^4;
zser = 2.*powercoef(1).*her + 4.*powercoef(2).*her.^3;
zsser = 2.*powercoef(1) + 12.*powercoef(2).*her.^2;
zer1= powercoef(1) + powercoef(2);
for i = 1:length(amplitude)
    zer = zer + amplitude(i).*(1−cos(her.*Zpi.*frequency(i)));
    zer1 = zer1 + amplitude(i).*(1−cos(Zpi.*frequency(i)));
    zser = zser + amplitude(i).*sin(her.*Zpi.*frequency(i)).*Zpi.*frequency(i);
    zsser = zsser+ amplitude(i).*cos(her.*Zpi.*frequency(i)).*(Zpi.*frequency(i)).^2;
end
zerr = PV.*zer./zer1;
zserr = PV.*zser./zer1;
zsserr = PV.*zsser./zer1;
return
```

11. Simplified Reconstruction of the Design Surface

It is easier to ignore the misalignments introduced by the stage; this is especially justified when the stage is calibrated beforehand with the procedure given in the Flow diagram shown in FIG. 7.

In principle, two different goals can be imagined for the measurement:

1. Reconstruct the surface from the measurement and present the result in an Cartesian x,y,z-coordinate system. This is comparable with the measurement result of a coordinate measuring machine. Note: also the aspheric equation is given in an x,y,z coordinate system.
2. Compare the measured surface with the design surface and report only the deviations as a function of x,y-coordinates.

In this second case, the KIND of comparison must be specified in addition to being completed. As two surfaces, a "real" measured surface and a fictive, mathematically defined design surface are never identical, it must be specified how the differences are achieved in detail. In this case, the DISTANCE between the surfaces along lines which always go through the center point of the spherical reference surface in every scan position are measured. In addition, these lines intersect both surfaces. These lines are NEARLY NORMAL to both surfaces, the deviation from normal is very small, less than 1 degree. The variation of the measured distance as a function of the angle of the lines to the surface normal is very small, the relative error being <1.5 e−4. As the surfaces are very close together, typically <100 nm, the absolute variation is <15 pm.

Figure 22:
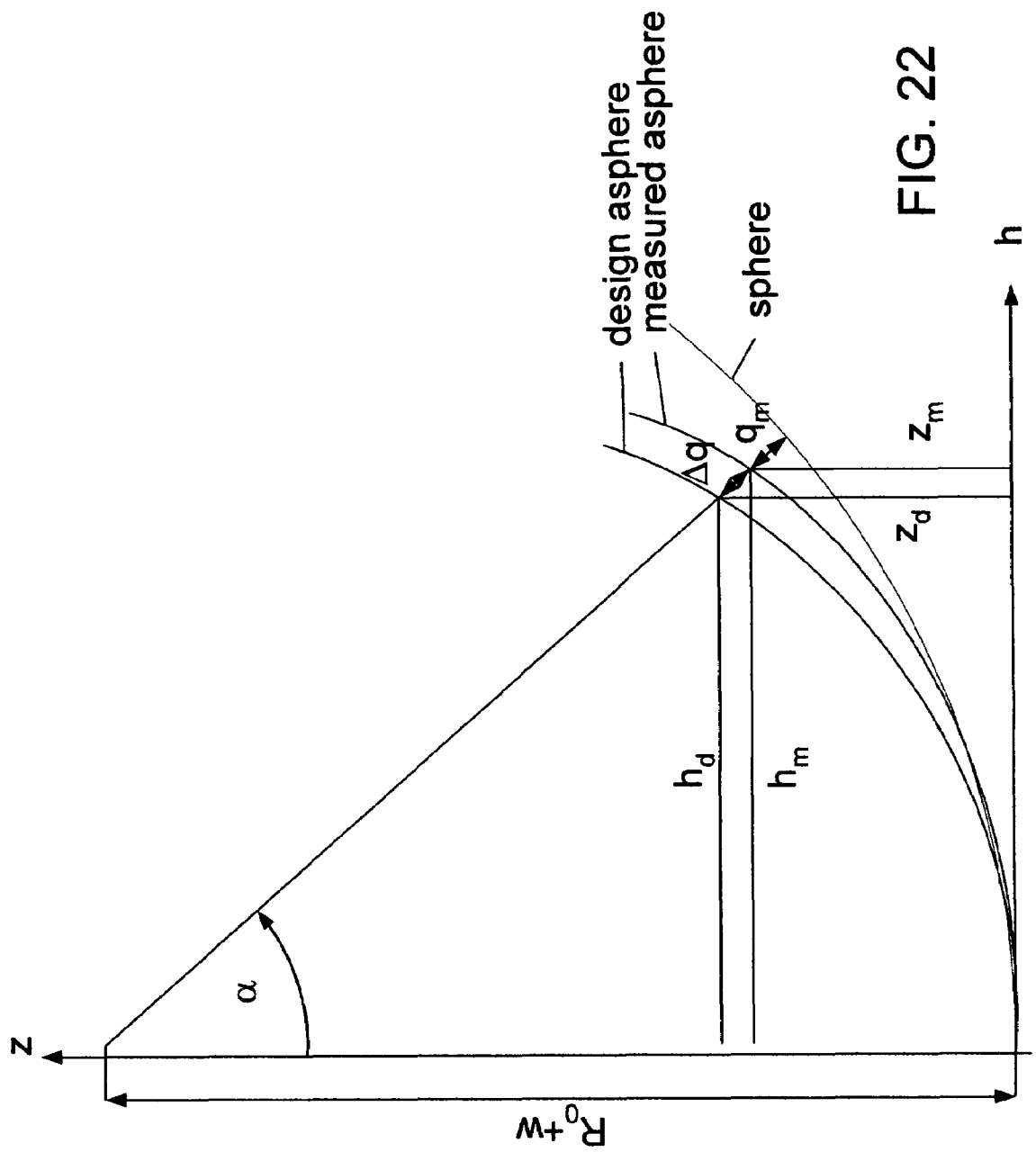
FIG. 22 is a diagram showing the measured deviation $\Delta q$ of an aspheric part from its design value $q_n$.

The distance between design surface and measured surface is called $\Delta q$ and this as shown in FIG. 22 where $q_m$ is the value that is measured and $\Delta q$ is the computed deviation of the measured surface from the design surface.

After FIG. 14 a flow diagram shows the two possible evaluations.

Figure 23:
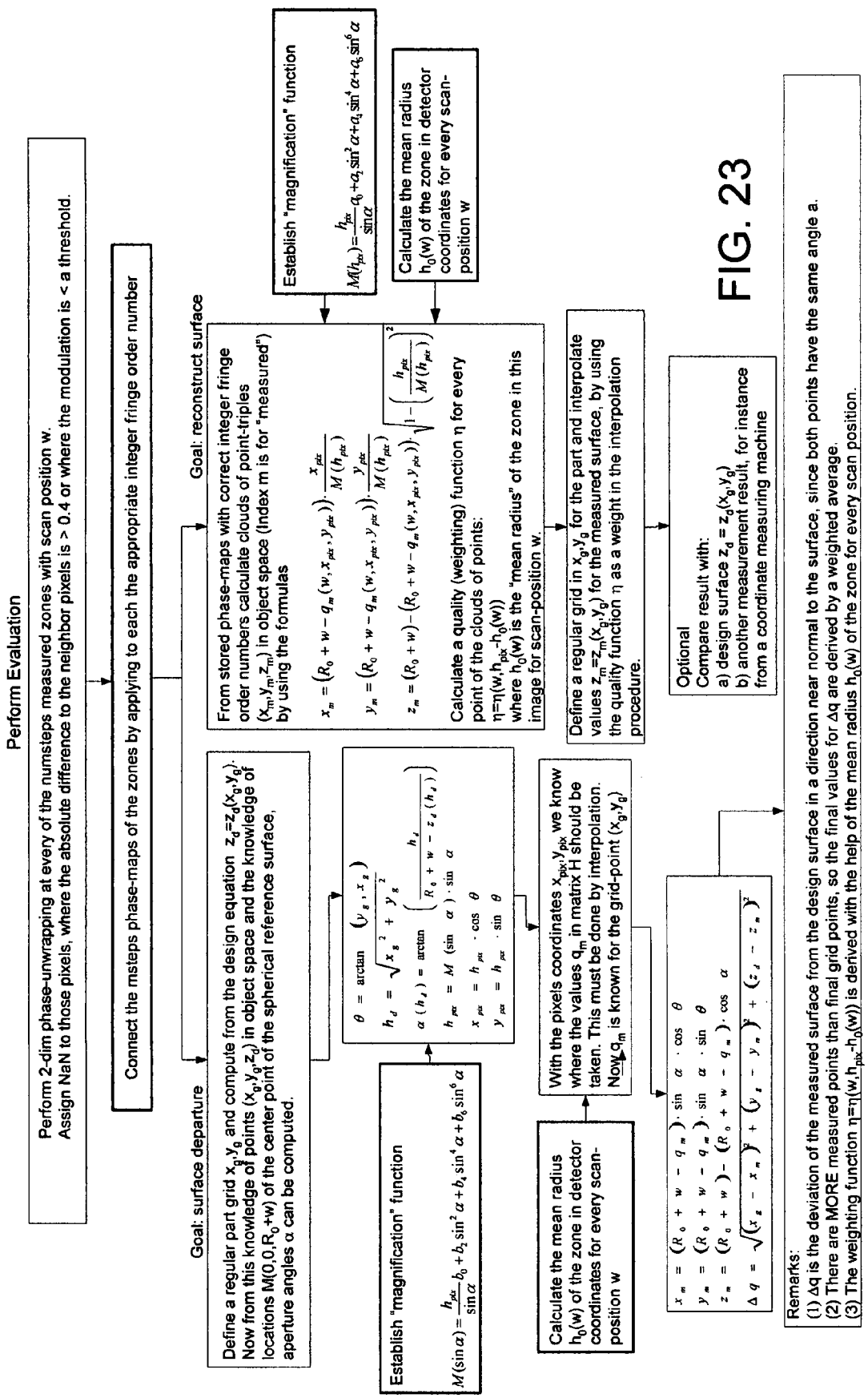
FIG. 23 is a flowchart showing the various steps in carrying out a sequence of the invention entitled "Perform Evaluation."

FIG. 23 shows a detailed flow diagram illustrating the various steps taken in two possible evaluations of the different measurement goals.

Another procedure for determining $M=M(h_{pix})$ as a bridge between pixels in image space and angles in object space involves measuring $\alpha$ from the following basic equations (See FIG. 2):

$$\frac{dp}{dv} = 1 - \cos\alpha \rightarrow \alpha = \arccos\left(1 - \frac{dp}{dv}\right)$$

but this requires additional measurements. Alternatively, use could be made of known values for q at the same pixel location for different values of w and fit a low-order polynomial to these values of q=q(w) for every pixel. Then, by differentiating these q-polynomials with respect to w, the function dq/dw is available for every pixel and for every value of w. These values for dq/dw are quite stable and can serve as an approximation for dp/dv as the above equations. They are correct when w=v, i.e. always, when the pixel has a common tangent for this value of w=v (i.e., it is a pixel at the "red circle").

There are other techniques for deriving the value of the optical system properties, M involving optimization techniques. Here, an assumed values of M is made and a calculation is made that should "satisfy" the result which was gained by measurement, i.e., the measurement is simultated by using a trial value for the so far unknown quantity, M. For present purposes, overlapping areas on the part are measured with at least two different scan positions. Two scan positions mean two "common tangent" points at the part surface with different h-values and the points in between must now be covered by both measurements. Looking from the inner red circle there are larger values for $\alpha$, and looking from the outer red circle, there are smaller values for $\alpha$. So this covers a certain range for $\alpha$, and therefore also for the function $M(\alpha)$. Assuming a rough idea of what the function $M(\alpha)$ could be, we want to refine this by→optimization. Then, this function for $\alpha$ is used in the reconstruction of the surface points h,z. All other quantities are known, as was pointed out. When $M(\alpha)$ is wrong, the two "leaves" z=z(h) (drawn as a continuous curve) will not match, and will some gap in between. So now $M(\alpha)$ is changed and the same measurement results are used again, to reconstruct two new leaves z=z(h). If the gap becomes smaller, the refinement of $M(\alpha)$ was in the right direction, otherwise not. Finally, for the correct function for $M(\alpha)$ the two leaves will match. This same procedure can be applied at all areas between the red circles and therefore $M(\alpha)$ can be found for all relevant values of a that occur.

It will be apparent to those skilled in the art that the invention may be configured to measure test optics designed for transmission and reflection.

Having described the invention with reference to particular embodiments and methodology sequences, other variants will occur to those skilled in the art based on the teachings of the invention, and such variants are intended to be within the scope of the appended claims.

What is claimed is:

1. An interferometric scanning method for measuring test optics having aspheric surfaces including those with large departures from spherical, said method comprising the steps of:

generating a reference wavefront from a known origin along a scanning axis;

aligning a test optic on the scanning axis and selectively moving it along said scanning axis relative to said known origin so that said reference wavefront intersects the test optic at the apex of the aspheric surface and at one or more radial positions where the reference wavefront and the aspheric surface intersect at points of common tangency in circular zones around said scanning axis to generate interferograms containing phase information about the differences in optical path length between the center of the test optic and the one or more radial positions;

imaging the interferograms onto a detector to provide an electronic signal carrying the phase information;

measuring the axial distance, v, by which the test optic is moved with respect to said origin;

determining the detector pixel height corresponding to where the reference wavefront and test surface slopes match for each scan position;

determining the angles, $\alpha$, of the actual normal to the surface of points at each zone as a function of the distance along the scanning axis; and using the angles, $\alpha$, determining the coordinates z and h of the aspheric surface at the common points of tangency.

2. The interferometric scanning method of claim 1 wherein the angles $\alpha$ are calculated by finding the positions in the image of the surface at scan positions w where:

$$\frac{dq}{dh_{pix}} = \text{zero}$$

for every pixel, where q is the difference between reference and test surfaces near the point where their slopes match minus the difference of the test and reference surfaces at the apex and then calculating the corresponding angles $\alpha$ by:

$$\arccos\left(1 - \frac{dq}{dw}\right).$$

3. The interferometric scanning method of claim 1 further including the step of determining the coordinates z and h of the aspheric surface at said common points of tangency and at their vicinity with $\alpha_{min} \leq \alpha \leq \alpha_{max}$, where $\alpha_{min}$ and $\alpha_{max}$ correspond to detector pixels heights for a scan position v where the fringe density in said interferogram is still low.

4. The interferometric scanning method of claim 1 further including reporting the shape of said aspheric surface as the difference between its measured shape and its design shape.

5. The interferometric scanning method of claim 1 wherein said reference wavefront is at least a partial spherical wavefront generated from said known origin along said scanning axis through the use of a spherical reference surface along said scanning axis upstream of said known origin.

6. The interferometric scanning method of claim 1 wherein the angles, $\alpha$, are calculated using the optical properties of the system used to image the interferograms.

7. The interferometric scanning method of claim 6 wherein said optical properties used to calculate said angles $\alpha$ comprise a mathematical function that relates pixel height, $h_{pix}$, in image space to said angle $\alpha$ in object space.

8. The interferometric scanning method of claim 7 wherein said function is in form a polynomial.

9. The interferometric scanning method of claim 8 wherein said polynomial function is of form:

$$M(h_{pix}) = \frac{h_{pix}}{\sin\alpha} = a_0 + a_2 \cdot h_{pix}^2 + a_4 \cdot h_{pix}^4 + a_6 \cdot h_{pix}^6 + \ldots$$

$$M(\sin\alpha) = \frac{h_{pix}}{\sin\alpha} = b_0 + b_2 \cdot \sin^2\alpha + b_4 \cdot \sin^4\alpha + b_6 \cdot \sin^6\alpha + \ldots$$

where the coefficients $a_n$ and $b_n$ are determined experimentally or by ray tracing the interferometer.

10. The interferometric scanning method of claim 9 wherein said coefficients $a_n$ and $b_n$ are determined experimentally prior to making any measurements of an aspheric surface.

11. The interferometric scanning method of claim 6 wherein said optical properties are determined while measuring an aspheric test surface.

12. The interferometric scanning method of claim 11 wherein said optical properties are determined using an optimization routine.

13. The interferometric scanning method of claim 10 wherein said coefficients $a_n$ and $b_n$ are determined with an artifact of known shape.

14. The interferometric scanning method of claim 9 wherein sin $\alpha$ can be substituted by:

$$\sin\alpha = \frac{h_{pix}}{M(h_{pix})} \text{ or by } \sin\alpha = \frac{h_{pix}}{M(\sin\alpha)}.$$

15. The interferometric scanning method of claim 9 wherein said coordinates h and z are given by:

$$\binom{h}{z} = \begin{pmatrix} \sin\alpha & 0 \\ -\cos\alpha & 1 \end{pmatrix} \cdot \binom{R_s}{R_v} = \begin{pmatrix} \sin\alpha & 0 \\ -\sqrt{1 - \sin^2\alpha} & 1 \end{pmatrix} \cdot \binom{R_s}{R_v}$$

$$\binom{h}{z} = \begin{pmatrix} \frac{h_{pix}}{M(h_{pix})} & 0 \\ -\sqrt{1 - \left(\frac{h_{pix}}{M(h_{pix})}\right)^2} & 1 \end{pmatrix} \cdot \binom{R_s(h_{pix})}{R_v(h_{pix} = 0)}$$

$$\binom{h}{z} = \begin{pmatrix} \frac{h_{pix}}{M(h_{pix})} & 0 \\ -\sqrt{1 - \left(\frac{h_{pix}}{M(h_{pix})}\right)^2} & 1 \end{pmatrix} \cdot \binom{R_2 - d_{zone}(h_{pix})}{R_2 - d_{apex}(h_{pix} = 0)}.$$

16. Interferometric scanning apparatus for measuring test optics having aspheric surfaces including those with large departures from spherical, said apparatus having a scanning axis and comprising:
- a radiation source and optical arrangement for generating a reference wavefront from a known origin along said scanning axis;
- a precision manipulator for aligning a test optic on said scanning axis and selectively moving it along said scanning axis relative to said known origin so that said reference wavefront intersects the test optic at the apex of the aspheric surface and at one or more radial positions where the reference wavefront and the aspheric surface intersect at points of common tangency in circular zones around said scanning axis to generate interferograms containing phase information about the differences in optical path length between the center of the test optic and the one or more radial positions;
- a two-dimensional detector;
- optics for imaging the interferograms onto said detector to provide an electronic signal carrying the phase information;
- a distance measuring device for measuring the axial distance, v, by which the test optic is moved with respect to said origin; and
- a programmable device for:
- determining the detector pixel height corresponding to where the reference wavefront and test surface slopes match for each scan position;
- determining the angles, $\alpha$, of the actual normal to the surface of points at each zone as a function of the distance along the scanning axis; and
- using the angles, $\alpha$, determining the coordinates z and h of the aspheric surface at the common points of tangency.

17. The interferometric scanning apparatus of claim 16 wherein the angles $\alpha$ are calculated by finding the positions in the image of the surface at scan positions w where:

$$\frac{dq}{dh_{pix}} = \text{zero}$$

for every pixel, where q is the difference between reference and test surfaces near the point where their slopes match minus the difference of the test and reference surfaces at the apex and then calculating the corresponding angles $\alpha$ by:

$$\arccos\left(1 - \frac{dq}{dw}\right).$$

18. The interferometric scanning apparatus of claim 16 wherein said programmable device is further configured to determine the coordinates z and h of the aspheric surface at said common points of tangency and at their vicinity with $\alpha_{min} \leq \alpha \leq \alpha_{max}$, where $\alpha_{min}$ and $\alpha_{max}$ correspond to detector pixels heights where the fringe density in said interferogram is still low.

19. The interferometric scanning apparatus of claim 16 wherein said programmable device is further configured to report the shape of said aspheric surface as the difference between its measured shape and its design shape.

20. The interferometric scanning apparatus of claim 16 wherein optical arrangement includes a spherical reference surface upstream of said known origin and said radiation source and optical arrangement are configured and arranged with respect to one another to provide said reference wavefront as at least a partial spherical wavefront generated from said known origin along said scanning axis.

21. The interferometric scanning apparatus of claim 16 wherein the optical properties of the system used to image the interferograms is used to calculate said angles $\alpha$ and comprises a mathematical function that relates pixel height, $h_{pix}$, in image space to said angle $\alpha$ in object space.

22. The interferometric scanning apparatus of claim 21 wherein said optical properties are determined while measuring an aspheric test surface.

23. The interferometric scanning method of claim 22 wherein said optical properties are determined using an optimization routine.

24. The interferometric scanning apparatus of claim 21 wherein said function is in form a polynomial.

25. The interferometric scanning apparatus of claim 16 wherein said interferometric scanning apparatus has the general form of a Fizeau.

* * * * *